United States Patent
Cho et al.

(10) Patent No.: US 11,023,935 B2
(45) Date of Patent: Jun. 1, 2021

(54) MOBILE PAYMENT METHOD, ELECTRONIC DEVICE, AND EXTERNAL PAYMENT DEVICE

(71) Applicant: Samsung Electronics Co., Ltd., Gyeonggi-do (KR)

(72) Inventors: Kum-Hyun Cho, Gyeonggi-do (KR); Soo-Pyoung Park, Seoul (KR); Seong-Hun Jeong, Seoul (KR)

(73) Assignee: Samsung Electronics Co., Ltd

(*) Notice: Subject to any disclaimer, the term of this patent is extended or adjusted under 35 U.S.C. 154(b) by 427 days.

(21) Appl. No.: 15/724,978

(22) Filed: Oct. 4, 2017

(65) Prior Publication Data
US 2018/0096405 A1    Apr. 5, 2018

(30) Foreign Application Priority Data
Oct. 4, 2016 (KR) .......................... 10-2016-0127667

(51) Int. Cl.
*G06Q 30/06* (2012.01)
*G06Q 20/40* (2012.01)
(Continued)

(52) U.S. Cl.
CPC ............ *G06Q 30/06* (2013.01); *G06Q 20/20* (2013.01); *G06Q 20/32* (2013.01); *G06Q 20/322* (2013.01); *G06Q 20/3278* (2013.01); *G06Q 20/40* (2013.01); *H04B 5/0037* (2013.01); *H04W 4/80* (2018.02); *H04W 52/0277* (2013.01);
(Continued)

(58) Field of Classification Search
CPC ........ G06Q 40/00; G06Q 40/04; G06Q 20/10; G06Q 20/32
USPC ................. 705/35, 39, 1.1, 26.1, 41, 16, 44; 235/380, 379
See application file for complete search history.

(56) References Cited

U.S. PATENT DOCUMENTS 9,190,849 B2 * 11/2015 Won ........................ G06Q 30/06
9,298,806 B1 * 3/2016 Vessenes .............. G06Q 20/065
(Continued)

FOREIGN PATENT DOCUMENTS

CN     203596626 U  *  5/2014
CN     205524348 U  *  8/2016

OTHER PUBLICATIONS

Chung et al."A dual-mode antenna for wireless charging and Near Field Communication," 2015 IEEE International Symposium on Antennas and Propagation & USNC/URSI National Radio Science Meeting, Vancouver, BC, 2015, pp. 1288-1289 (Year: 2015).*
(Continued)

*Primary Examiner* — Kelly S. Campen
(74) *Attorney, Agent, or Firm* — The Farrell Law Firm, P.C.

(57) ABSTRACT

An electronic device including a battery; a display receiving power from the battery; a memory electrically connected to the display; and a processor electrically connected to the memory, wherein the memory is configured to store instructions causing the processor to, when executed, identify a power state of the battery based on a request for a mobile payment, when the power state is within a first range, receive power from a wireless charger capable of performing wireless communication with the electronic device, and when the power state is within a second range due to the reception of the power, perform the mobile payment.

15 Claims, 14 Drawing Sheets

(51) Int. Cl.
*H04B 5/00* (2006.01)
*G06Q 20/32* (2012.01)
*H04W 4/80* (2018.01)
*G06Q 20/20* (2012.01)
*H04W 52/02* (2009.01)
*G07F 15/00* (2006.01)

(52) U.S. Cl.
CPC ....... *G07F 15/006* (2013.01); *H04W 52/0261* (2013.01); *Y02D 30/70* (2020.08)

(56) References Cited

U.S. PATENT DOCUMENTS

| | | | | |
|---|---|---|---|---|
| 9,495,674 | B2* | 11/2016 | Sanaboyina | G06Q 20/3274 |
| 10,127,546 | B2* | 11/2018 | Sanaboyina | G06Q 20/3274 |
| 2006/0113955 | A1* | 6/2006 | Nunally | H02J 50/20 |
| | | | | 320/108 |
| 2009/0156268 | A1* | 6/2009 | Kim | H02J 7/0047 |
| | | | | 455/573 |
| 2009/0299918 | A1* | 12/2009 | Cook | G06Q 30/04 |
| | | | | 705/412 |
| 2010/0201310 | A1* | 8/2010 | Vorenkamp | G06Q 30/04 |
| | | | | 320/108 |
| 2012/0028575 | A1* | 2/2012 | Chen | H04B 5/0081 |
| | | | | 455/41.1 |
| 2012/0290470 | A1* | 11/2012 | Lee | G06Q 20/3278 |
| | | | | 705/39 |
| 2015/0006395 | A1* | 1/2015 | Chu | H02J 7/00045 |
| | | | | 705/44 |
| 2015/0016707 | A1* | 1/2015 | Williams, Jr. | G06K 9/186 |
| | | | | 382/139 |
| 2015/0120567 | A1* | 4/2015 | Van Rooyen | G06Q 20/3829 |
| | | | | 705/59 |
| 2015/0142653 | A1* | 5/2015 | Neumann | G06Q 20/3278 |
| | | | | 705/44 |
| 2015/0254621 | A1* | 9/2015 | Matsumoto | G06K 7/0004 |
| | | | | 235/380 |
| 2015/0310424 | A1* | 10/2015 | Myers | G06Q 20/3678 |
| | | | | 705/69 |
| 2015/0379510 | A1* | 12/2015 | Smith | G06Q 20/3829 |
| | | | | 705/71 |
| 2016/0005068 | A1* | 1/2016 | Im | G06Q 30/0237 |
| | | | | 705/14.14 |
| 2016/0098723 | A1* | 4/2016 | Feeney | H02J 7/00045 |
| | | | | 705/44 |
| 2016/0253651 | A1 | 9/2016 | Park et al. | |
| 2016/0275480 | A1* | 9/2016 | Sanaboyina | G06Q 20/3274 |
| 2017/0061426 | A1* | 3/2017 | Sanaboyina | G06Q 20/3274 |
| 2019/0005544 | A1* | 1/2019 | Hong | G06Q 50/30 |
| 2019/0251547 | A1* | 8/2019 | Sanaboyina | G06F 1/263 |

OTHER PUBLICATIONS

European Search Report dated Dec. 4, 2017 issued in counterpart application No. 17194613.0-1871, 8 pages.
EP Summons to Attend Oral Proceedings dated Apr. 7, 2021 issued in counterpart application No. 17194613.0-1213, 9 pages.

* cited by examiner

MOBILE PAYMENT METHOD, ELECTRONIC DEVICE, AND EXTERNAL PAYMENT DEVICE

PRIORITY

This application claims priority under 35 U.S.C. § 119(a) to a Korean Patent Application filed on Oct. 4, 2016 in the Korean Intellectual Property Office and assigned Ser. No. 10-2016-0127667, the entire content of which is incorporated herein by reference.

BACKGROUND

1. Field of the Disclosure

The present disclosure relates generally to a mobile payment method in an electronic device, and an electronic device for the same, and more particularly, to a method of performing a mobile payment by charging a minimum amount of power required for the mobile payment in a low-battery state, and an electronic device for the same.

2. Description of the Related Art

In general, a credit card payment may be requested by a procedure of paying a payment amount according to a purchase of a product or consumption through a point of sales (POS) terminal in a store and authenticating the payment amount by a payment means (for example, a user's credit card). A payment is completed through a process in which corresponding payment information is transmitted to a server of a bank or a credit card company through a value-added network (VAN) connected to a POS terminal, a corresponding payment amount is approved by the server of the credit card company (or bank), and then secondary user authentication (for example, a signature) is transmitted to the server from the POS terminal through the VAN.

Since a wireless payment system has recently been commercialized, various types of payment have come to be used. For example, when a user registers credit card information in a smart phone in advance and brings the smart phone close to a POS terminal instead of swiping the credit card, the payment is performed through communication between the devices. By confirming the payment through recognition of a user's fingerprint, the payment is performed through a highly secure and simple procedure, so that the payment type using the smart phone is frequently used.

A payment type using an electronic device such as a smart phone cannot perform mobile payment when there is a lack of battery capacity. For example, in a low-battery state, power may be suddenly turned off without notice while the payment is being performed. Further, in the low-battery state, the mobile payment may not be attempted at all. Accordingly, since the mobile payment may not be performed due to the low-battery state, a user is required to carry a physical credit card, which inconveniences the user.

Therefore, a method of easily using a mobile payment type even in the low-battery state is required in consideration of user convenience in that the payment can be completed through only a simple authentication procedure using the electronic device that the user always carries.

In order to control such various functions, it may be required to consider structural changes in a structural part of a wireless payment system and/or software.

SUMMARY

An aspect of the present disclosure provides a method of performing a mobile payment by charging a minimum amount of power required for the mobile payment in a low-battery state, and an electronic device for the same.

Another aspect of the present disclosure provides a method of performing a mobile payment by receiving power through a wireless charger mounted to a payment terminal, and an electronic device for the same.

Another aspect of the present disclosure provides an electronic device in a low-battery state that can perform a payment while receiving a minimum amount of power required for the mobile payment through wireless charging. Even if the amount of power is lower than the amount of power required for the mobile payment, the electronic device may be charged with the minimum amount of power before the mobile payment, so there is an effect of preventing the mobile payment from being stopped during the mobile payment. Accordingly, a user can use the mobile payment anywhere and anytime, which improves user convenience.

In accordance with an aspect of the present disclosure, an electronic device is provided. The electronic device includes a battery; a display receiving power from the battery; a memory electrically connected to the display; and a processor electrically connected to the memory, wherein the memory is configured to store instructions causing the processor to, when executed, identify a power state of the battery based on a request for a mobile payment, when the power state is within a first range, receive power from a wireless charger capable of performing wireless communication with the electronic device, and when the power state is within a second range due to the reception of the power, perform the mobile payment.

In accordance with another aspect of the present disclosure, an external payment device is provided. The external payment device includes a communication unit configured to communicate with a wireless charger; and a processor configured to, in response to a request for a mobile payment from an electronic device, when a power state of a battery of the electronic device is within a first range, make a request for performing wireless charging with the electronic device to the wireless charger, and when the power state of the battery is within a second range as the electronic device receives power from the wireless charger, perform the mobile payment with the electronic device.

In accordance with another aspect of the present disclosure, a method of performing a mobile payment by an electronic device is provided. The method includes identifying a power state of a battery of the electronic device for the mobile payment through an external payment device; when the power state of the battery is within a first range, receiving power from a wireless charger configured to communicate with the external payment device; and when the power state of the battery is within a second range according to the reception of the power from the wireless charger, performing the mobile payment through the external payment device.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
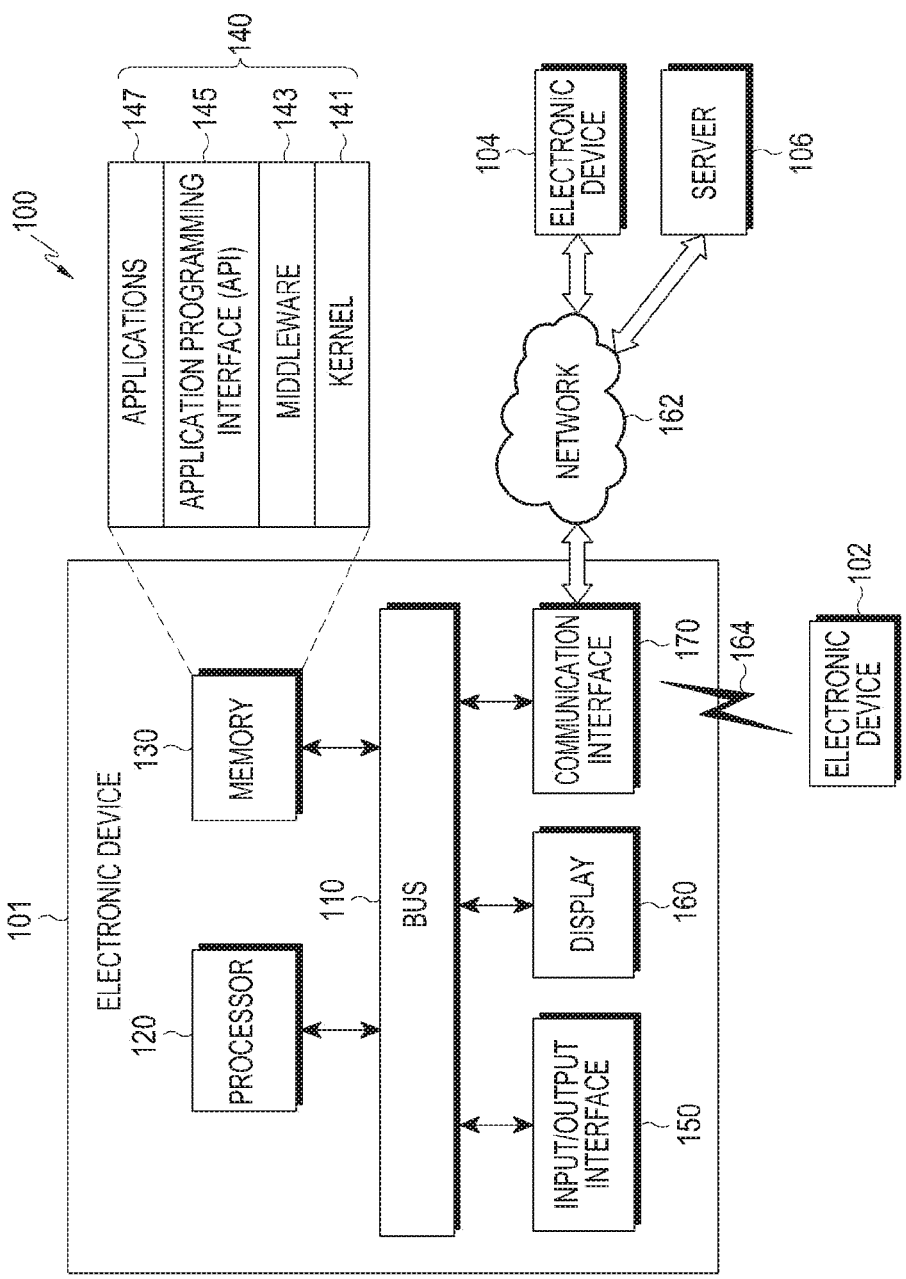
FIG. 1 is a block diagram of a network environment including an electronic device according to an embodiment of the present disclosure.

Hereinafter, various embodiments of the present disclosure are described with reference to the accompanying drawings. The embodiments and the terms used in the present disclosure are not intended to limit the present disclosure to specific forms, and are intended to include various modifications, equivalents, and/or alternatives to the corresponding embodiments within the scope of the present disclosure as defined by the accompanying claims and their equivalents. In describing the accompanying drawings, similar reference numerals may be used to designate similar elements. A singular expression may include a plural expression unless they are definitely different in a context. In the present disclosure, the expressions "A or B", "at least one of A and/or B", and "A/B" may include all possible combinations of the items listed. The expressions "a first", "a second", "the first", and "the second" used in the present disclosure may modify various components regardless of the order and/or the importance of the components but is not intended to limit the corresponding components. When an element (e.g., a first element) is referred to as being "(functionally or communicatively) connected," or "directly coupled" to another element (e.g., a second element), the element may be connected directly to the other element or connected to the other element through yet another element (e.g., a third element).

The expression "configured to" as used in the present disclosure may be interchangeably used with, for example, the expressions "suitable for", "having the capacity to", "designed to", "adapted to", "made to", and "capable of" in terms of hardware or software, according to circumstances. Alternatively, in some situations, the expression "device configured to" may indicate that the device, together with other devices or components, "is able to". For example, the expression "processor adapted (or configured) to perform A, B, and C" may indicate a dedicated processor (e.g., an embedded processor) only for performing the corresponding operations or a general-purpose processor (e.g., a central processing unit (CPU) or an application processor (AP)) that can perform the corresponding operations by executing one or more software programs stored in a memory device.

An electronic device according to an embodiment of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a moving picture experts group (MPEG-1) audio layer-3 (MP3) player, a mobile medical device, a camera, and a wearable device. According to an embodiment of the present disclosure, the wearable device may include at least one of an accessory type (e.g., a watch, a ring, a bracelet, an anklet, a necklace, glasses, a contact lens, or a head-mounted device (HMD)), a fabric or clothing integrated type (e.g., electronic clothing), a body-mounted type (e.g., a skin pad or tattoo), and a bio-implantable type (e.g., an implantable circuit). An electronic device may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV™), a game console (e.g., Xbox® and PlayStation®), an electronic dictionary, an electronic key, a camcorder, and an electronic photo frame.

In an embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA) device, a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automated teller machine (ATM) in banks, a POS terminal in a shop, or an Internet of Things (IoT) device (e.g., a light bulb, various sensors, an electric or gas meter, a sprinkler device, a fire alarm, a thermostat, a streetlamp, a toaster, sporting goods, a hot water tank, a heater, a boiler, etc.). An electronic device may include at least one of a part of furniture or a building/structure, an electronic board, an electronic signature receiving device, a projector, and various types of measuring instruments (e.g., a water meter, an electric meter, a gas meter, a radio wave meter, and the like). An electronic device may be flexible, or may be a combination of one or more of the aforementioned various devices. An electronic device is not limited to the above described devices. The term "user" may indicate a person using an electronic device or a device (e.g., an artificial intelligence electronic device) using an electronic device.

FIG. 1 is a block diagram of a network environment 100 including an electronic device 101 according to an embodiment of the present disclosure.

Referring to FIG. 1, the electronic device 101 may include a bus 110, a processor 120, a memory 130, an input/output interface 150, a display 160, and a communication interface 170. The electronic device 101 may omit at least one of the elements, or may further include other elements.

The bus 110 may include a circuit that interconnects the elements 110 to 170 and transfers communication (for example, control messages and/or data) between the elements 110 to 170.

The processor 120 may include one or more of a CPU, an AP, and a communication processor (CP). The processor 120, for example, may carry out operations or data processing relating to the control and/or communication of at least one other element 110 to 170 of the electronic device 101.

The memory 130 may include a volatile and/or a non-volatile memory. The memory 130 may store, for example, instructions or data relevant to at least one other element 10 to 170 of the electronic device 101.

According to an embodiment of the present disclosure, the memory 130 may store software and/or a program 140. The program 140 may include, for example, a kernel 141, middleware 143, an application programming interface (API) 145, and/or application programs (or applications) 147. At least a part of the kernel 141, the middleware 143, or the API 145 may be referred to as an operating (OS).

According to an embodiment of the present disclosure, the memory 130 may store instructions to cause the processor 120 to, when executed, identify a power state of a battery included in the electronic device 101 based on a request for a mobile payment, when the power state is within a first range, receive power from a wireless charger, which may perform wireless communication with the electronic device 101, and when the power state is within a second range according to the reception of power, perform the mobile payment.

The kernel 141 may control or manage system resources (for example, the bus 110, the processor 120, or the memory 130) used for executing an operation or function implemented by other programs (for example, the middleware 143, the API 145, or the application programs 147). Furthermore, the kernel 141 may provide an interface through which the middleware 143, the API 145, or the application programs 147 may access the individual elements 110 to 170 of the electronic device 101 to control or manage the system resources.

The middleware 143 may function as, for example, an intermediary for allowing the API 145 or the application programs 147 to communicate with the kernel 141 to exchange data. Furthermore, the middleware 143 may process one or more task requests, which are received from the application programs 147, according to priorities thereof. For example, the middleware 143 may assign priorities for using the system resources (for example, the bus 110, the processor 120, the memory 130, or the like) of the electronic device 101 to one or more of the application programs 147, and may process the one or more task requests. The API 145 is an interface used by the application programs 147 to control a function provided from the kernel 141 or the middleware 143, and may include, for example, at least one interface or function (for example, an instruction) for file control, window control, image processing, character control, or the like. For example, the input/output interface 150 may forward instructions or data, input from a user or an external device, to the other element(s) of the electronic device 101, or may output instructions or data, received from the other element(s) of the electronic device 101, to the user or the external device.

The display 160 may include, for example, a liquid crystal display (LCD), a light-emitting diode (LED) display, an organic LED (OLED) display, a micro electro-mechanical system (MEMS) display, or an electronic paper display. The display 160 may display, for example, various types of content (e.g., text, images, videos, icons, and/or symbols) to a user. The display 160 may include a touch screen and may receive, for example, a touch, a gesture, a proximity, or a hovering input using an electronic pen or a part of a user's.

The communication interface 170 may configure communication, for example, between the electronic device 101 and an external device (for example, a first external electronic device 102, a second external electronic device 104, or a server 106). For example, the communication interface 170 may be connected to a network 162 through wireless or wired communication to communicate with the second external electronic device 104 or the server 106.

The wireless communication may include, for example, cellular communication that uses at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), or the like. According to an embodiment of the present disclosure, the wireless communication may include, for example, at least one of wireless fidelity (WiFi), Bluetooth (BT), Bluetooth low energy (BLE), Zig-Bee, near field communication (NFC), magnetic secure transmission (MST), radio frequency (RF), and body area network (BAN). According to an embodiment of the present disclosure, the wireless communication may include a global navigation satellite system (GNSS). The GNSS may be, for example, a GPS, a global navigation satellite system (Glonass), a Beidou navigation satellite system (Beidou), or the European global satellite-based navigation system (Galileo). The term "GPS" may be used interchangeable with the term "GNSS". The wired communication may include, for example, at least one of a universal serial bus (USB), a high-definition multimedia interface (HDMI), recommended standard 232 (RS-232), power line communication, and a plain old telephone service (POTS). The network 162 may include a telecommunications network, for example, at least one of a computer network (for example, a local area network (LAN) or a wide area network (WAN), the Internet, and a telephone network.

Each of the first electronic device 102 and second external electronic device 104 may be of the same or a different type from the electronic device 101.

According to an embodiment of the present disclosure, all or some of the operations performed in the electronic device 101 may be performed in another electronic device or a plurality of electronic devices 102 and 104, or the server 106.

According to an embodiment of the present disclosure, when the electronic device 101 must perform a function or service automatically or in response to a request, the electronic device 101 may request the first electronic device 102, the second electronic device 104, or the server 106 to perform at least some functions relating thereto, instead of autonomously or additionally performing the function or service. The first electronic device 102, the second electronic device 104, or the server 106 may execute the requested functions or the additional functions, and may deliver information about the result of the execution to the electronic device 101. The electronic device 101 may provide the received result as is, or may additionally process the received result to provide the requested functions or services. To this end, for example, cloud computing, distributed computing, or client-server computing technology may be used.

According to an embodiment of the present disclosure, the processor 120 may identify the power state of the battery included in the electronic device 101 for a mobile payment through an external payment device such as a POS terminal, when the power state is within a first range, receive power from a wireless charger connected to communicate with the external payment device, and when the power state is within a second range according to the reception of power from the wireless charger, perform the mobile payment through the external payment device. The first range refers to a range less than the minimum amount of remaining battery charge required for the mobile payment and the second range corresponds to a range having a value greater than the first range and refers to a range greater than or equal to the minimum amount of remaining battery charge required for the mobile payment.

According to an embodiment of the present disclosure, when the mobile payment is performed with the external payment device, the processor 120 may identify the remaining battery charge while making a request for mobile payment to the external payment device. That is, the processor 120 may identify whether the battery has the minimum amount of power required for the mobile payment. When the battery does not have the minimum amount of power required for the mobile payment (for example, a low-battery state), the processor 120 may make a request for wireless charging to the external payment device. In this case, the electronic device 101 may have different battery consumptions depending on the standby state and operations, and the low-battery state may indicate that the remaining battery charge of the electronic device 101 is less than the remaining battery charge consumed by the mobile payment before the battery is discharged.

That is, the processor 120 may make a request for wireless charging to the external payment device to make the wireless charger, which is connected to communicate with the external payment device, transmit power to the electronic device 101. In response to the request for charging, the external payment device may transmit a command for starting the wireless charging to the wireless charger, and the wireless charger may start transmitting power to the electronic device 101.

According to an embodiment of the present disclosure, when the power state of the battery is within the first range, the processor 120 may record the power state included in the first range in an RF identification (RFID) tag in order to inform the wireless charger of the power state. Accordingly, when the user brings the electronic device 101 close to the external payment device for the mobile payment, the external payment device may acquire the power state of the battery, that is, power state information included in the first range recorded in the RFID tag of the electronic device 101, through an RFID reader included in the external payment device.

Accordingly to an embodiment of the present disclosure, the power state information included in the first range of the electronic device 101 may be displayed through the screen of the electronic device 101. For example, the current remaining battery charge may be indicated by a percentage (%), and the minimum amount of battery required for the mobile payment may be also indicated by %. When the current remaining battery charge is, for example, 2%, but it is assumed that the remaining battery charge should be at least 3% or more for the mobile payment, the user may be informed of the need of charging for the payment through displaying of an amount of charging that should be performed, indicated by %, a status bar indicating the current power state, or an icon. Although a description has been made with reference to an example in which the power state included in the first range corresponds to a case less than the minimum amount of battery required for the mobile payment, which is 3%, for facilitating understanding of the present disclosure, the threshold thereof may not be limited thereto. Since battery consumption varies depending on the characteristics, standby state, and operations being performed by the electronic device 101, the minimum amount of battery required for the mobile payment may vary, and the threshold may be determined as another % according to current consumption of the mobile payment.

In addition, before receiving a mobile payment request from the electronic device 101, the external payment device may indicate that wireless charging of the electronic device 101 is needed based on a pre-acquired power state. Accordingly, the external payment device may make a request for performing wireless charging with the electronic device 101 to the wireless charger connected for communication therewith.

Alternatively, when the user brings the electronic device 101 close to the external payment device or puts the electronic device 101 on the external payment device for the mobile payment, the electronic device 101 may be connected to the wireless charger in response to a signal from the wireless charger connected to the external payment device. In this case, after the wireless charger informs the external payment device of the start of wireless charging, the wireless charger may transmit power to the electronic device 101 after receiving approval for wireless charging from the external payment device.

The wireless charger may identify the state of the battery of the electronic device 101 based on the response from the electronic device 101, and may recognize that the wireless charging is needed based on the identified battery state. Accordingly, as the wireless charger informs the external payment device of the start of the wireless charging, the electronic device 101 may receive power from the wireless charger. Further, the external payment device may be made aware of a wireless charging progress state of the electronic device 101 based on information about a wireless charging progress state transmitted from the wireless charger, and may thus determine the power state of the battery of the electronic device 101. That is, the external payment device may determine whether the power state is within a second range. The second range corresponds to a power state that is greater than the first range, and refers to a state greater than or equal to the minimum amount of battery required for the mobile payment, for example, the case where 3% or more battery power is left.

According to an embodiment of the present disclosure, when the charging is performed through the wireless charger, that is, when the power state of the battery is within the second range according to the reception of power from the wireless charger while the charging is performed by outputting power received from the wireless charger to the battery, which is included in the electronic device or is removable from the electronic device 101, the processor 120 may transmit payment information to the external payment device after user authentication.

More specifically, when the remaining battery charge reaches the minimum amount of power required for mobile payment, that is, 3% or more according to the reception of power from the wireless charger, the processor 120 may complete the mobile payment through the external payment device.

In this case, when the remaining battery charge reaches the minimum amount of power required for the mobile payment, the processor 120 may perform the payment via a mobile payment authentication procedure. Here, when the minimum wireless charging is completed, that is, the battery is charged with power for the mobile payment, the processor 120 may transmit payment information required for the mobile payment to the external payment device after the user authentication, but may transmit the payment information required for the mobile payment to the external payment device after the user authentication before the start of the wireless charging. The payment information may indicate information on a payment means, and user authentication information may indicate information input by the user in order to reduce the risk of unauthenticated use for payment. According to an embodiment of the present disclosure, the user authentication information may include, for example, user fingerprint information.

According to an embodiment of the present disclosure, when the user brings the electronic device 101 close to the external payment device for the mobile payment, the processor 120 may receive power from the wireless charger and charge the battery. In this case, the electronic device 101 may perform a predetermined authentication procedure with the wireless charger and wirelessly receive power only when the authentication is successful. That is, in response to power periodically generated from the wireless charger, the processor 120 may perform authentication with the wireless charger by transmitting a response, and may then perform wireless charging by reporting the power state to the wireless charger.

Further, the processor 120 may transmit a signal that makes a request for wireless power transmission, information required for wireless power reception, state information of the electronic device 101, or control information of the electronic device 101 to the wireless charger. The processor 120 may transmit a message indicating a charging state to the wireless charger.

According to an embodiment of the present disclosure, the processor 120 may perform control to output at least one of a minimum target charging amount, a current battery amount, a minimum target charging time, and a charging progress process for the mobile payment on the display 160.

According to an embodiment an embodiment of the present disclosure, the processor 120 may acquire information on the amount of power consumed by the mobile payment, update power consumption information according to a payment type based on the acquired information on the amount of power, and store the updated information in the memory 130. The power consumption of the electronic device 101 may vary depending on the payment type. Even for the same payment type, the power consumption may vary depending on the card authentication type selected by the user and for each country. Even for the same type of electronic device, the power amount required for the payment may vary, since the capacity of the electronic device may be different according to a pattern of use pattern of a user.

Accordingly, the processor 120 may calculate the number of times the electronic device can perform payment according to the power state of the battery based on the information on power consumption through the payment type stored in the memory 130. Further, the processor 120 may perform control to output a payment progress state including the calculated number of times the electronic device can perform payment on the display 160.

The detailed method by which the electronic device 101 charges power required for the mobile payment is described below.

Figure 2:
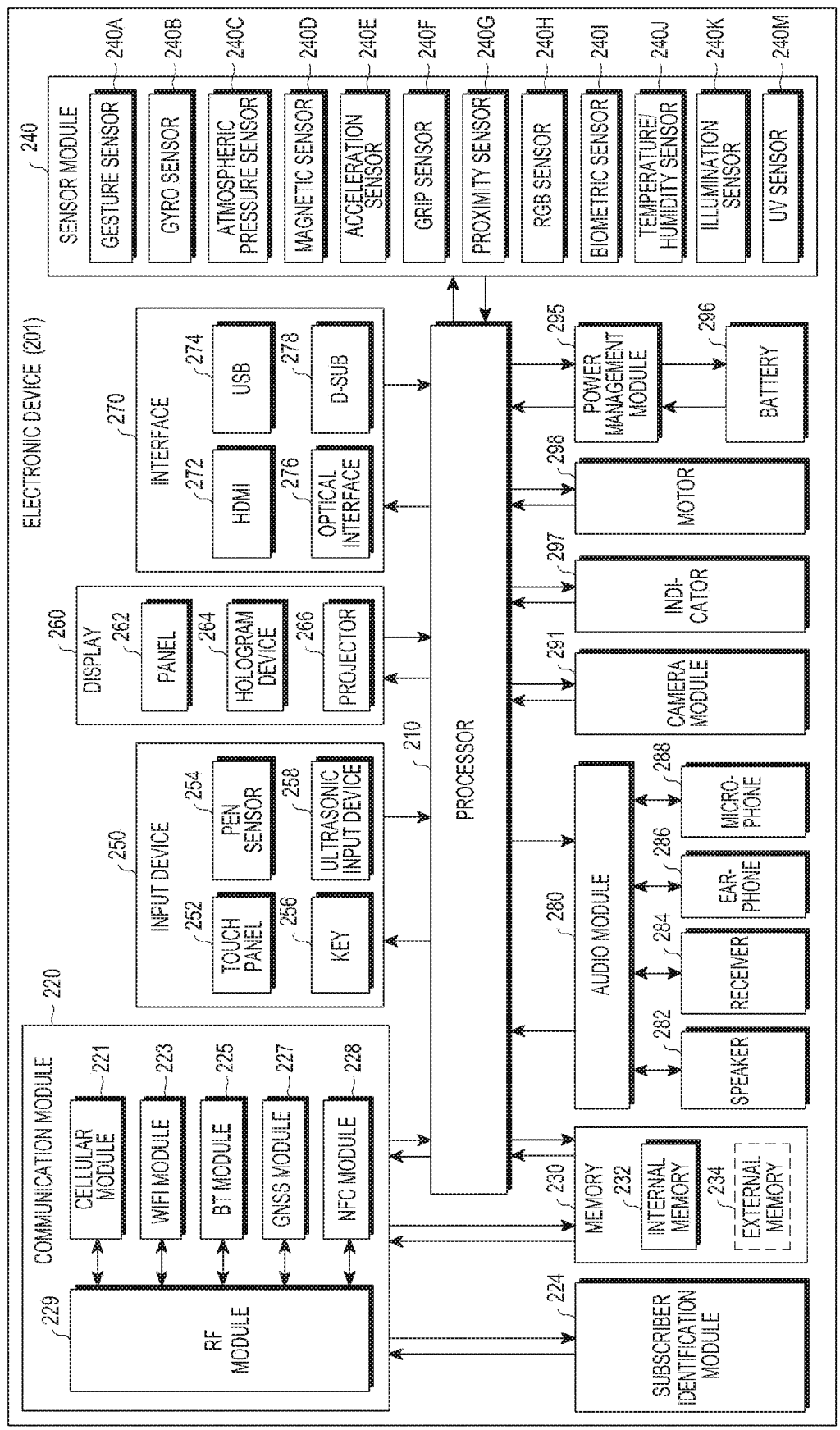
FIG. 2 is a block diagram of an electronic device according to an embodiment of the present disclosure.

FIG. 2 is a block diagram of an electronic device 201 according to an embodiment of the present disclosure.

Referring to FIG. 2, the electronic device 201 may include, for example, all or part of the electronic device 101 illustrated in FIG. 1. The electronic device 201 may include at least one processor 210 (for example, an AP), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected thereto and may perform various data processing and operations by driving an OS or an application program. The processor 210 may be embodied, for example, as a system on chip (SoC).

According to an embodiment of the present disclosure, the processor 210 may further include a graphics processing unit (GPU) and/or an image signal processor. The processor 210 may also include at least some of the elements illustrated in FIG. 2 (for example, a cellular module 221). The processor 210 may load, in volatile memory, instructions or data received from at least one of the other elements (for example, a non-volatile memory), process the loaded instructions or data, and store the resultant data in the non-volatile memory.

The communication module 220 may have a configuration that is the same as, or similar to, that of the communication interface 170 in FIG. 1. The communication module 220 may include, for example, the cellular module 221, a WiFi module 223, a BT module 225, a GNSS module 227, an NFC module 228, and an RF module 229. The cellular module 221 may provide, for example, a voice call, a video call, a text message service, an Internet service, or the like through a communication network. According to an embodiment of the present disclosure, the cellular module 221 may identify or authenticate the electronic device 201 in the communication network using a subscriber identification module (SIM) 224 (for example, a SIM card). According to an embodiment of the present disclosure, the cellular module 221 may perform at least some of the functions that the AP 210 may provide. The cellular module 221 may include a CP. At least some (two or more) of the cellular module 221, the WiFi module 223, the BT module 225, the GNSS module 227, and the NFC module 228 may be included in a single integrated circuit (IC) or IC package. The RF module 229, for example, may transmit/receive a communication signal (for example, an RF signal). The RF module 229 may include, for example, a transceiver, a power amplifier module (PAM), a frequency filter, a low noise amplifier (LNA), an antenna, and the like. At least one of the cellular module 221, the WiFi module 223, the BT module 225, the GNSS module 227, and the NFC module 228 may transmit/receive an RF signal through a separate RF module. The SIM 224 may include, for example, an embedded SIM, and may contain unique identification information (for example, an integrated circuit card identifier (ICCID)) or subscriber information (for example, an international mobile subscriber identity (IMSI)).

The memory 230 (for example, the memory 130) may include, for example, an internal memory 232 or an external memory 234. The internal memory 232 may include, for example, at least one of a volatile memory (for example, a dynamic random access memory (DRAM), a static RAM (SRAM), a synchronous DRAM (SDRAM), and the like) and a non-volatile memory (for example, a one-time programmable read only memory (ROM) (OTPROM), a programmable ROM (PROM), an erasable PROM (EPROM), an electrically erasable PROM (EEPROM), a mask ROM, a flash ROM, a flash memory, a hard disc drive, or a solid state drive (SSD)). The external memory 234 may include a flash drive, for example, a compact flash (CF) drive, a secure digital (SD) memory card, a micro-SD memory card, a mini-SD memory card, an eXtreme digital (xD) memory card, a multi-media card (MMC), a memory stick, and the like. The external memory 234 may be functionally and/or physically connected to the electronic device 201 through various interfaces.

The sensor module 240 may, for example, measure a physical quantity or detect an operating state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, and a ultraviolet (UV) light sensor 240M. Additionally or alternatively, the sensor module 240 may include, for example, an electronic nose (e-nose) sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In an embodiment of the present disclosure, the electronic device 201 may further include a processor, which is configured to control the sensor module 240, as a part of the processor 210 or separately from the processor 210 in order to control the sensor module 240 while the processor 210 is in a reduced power or sleep state.

The input device 250 may include, for example, a touch panel 252, a (digital) pen sensor 254, a key 256, or an ultrasonic input device 258. The touch panel 252 may be, for example, at least one of a capacitive type panel, a resistive type panel, an infrared type panel, and an ultrasonic type panel. Furthermore, the touch panel 252 may further include a control circuit. The touch panel 252 may further include a tactile layer to provide a tactile reaction to a user. The (digital) pen sensor 254 may include, for example, a recognition sheet that is a part of, or separate from, the touch panel 252. The key 256 may include, for example, a physical button, an optical key, or a keypad. The ultrasonic input device 258 may detect ultrasonic waves, which are generated by an input tool, through a microphone 288 to identify data corresponding to the detected ultrasonic waves.

The display 260 (for example, the display 160 in FIG. 1) may include a panel 262, a hologram device 264, a projector 266, and/or a control circuit for controlling them. The panel 262 may be implemented to be, for example, flexible, transparent, or wearable. The panel 262, together with the touch panel 252, may be configured as one or more modules.

According to an embodiment of the present disclosure, the panel 262 may include a pressure sensor (or a POS sensor) which may measure the strength of pressure of a user's touch. The pressure sensor may be integrated with the touch panel 252, or may be implemented by one or more sensors separated from the touch panel 252. The hologram device 264 may display a three-dimensional image in the air using the interference of light. The projector 266 may display an image by projecting light onto a screen. The screen may be located, for example, in the interior of, or on the exterior of, the electronic device 201.

The interface 270 may include, for example, an HDMI 272, a USB 274, an optical interface 276, or a D-subminiature (D-sub) connector 278. The interface 270 may be included, for example, in the communication interface 170 illustrated in FIG. 1. Additionally or alternatively, the interface 270 may, for example, include a mobile high-definition link (MHL) interface, an SD card/MMC interface, or an Infrared Data Association (IrDA) standard interface.

The audio module 280 may convert, for example, sound into an electrical signal, and vice versa. At least some elements of the audio module 280 may be included, for example, in the input/output interface 145 illustrated in FIG. 1. The audio module 280 may process sound information that is input or output through, for example, a speaker 282, a receiver 284, an earphone 286, the microphone 288, and the like.

The camera module 291 is a device that can photograph a still image and a moving image. According to an embodiment of the present disclosure, the camera module 291 may include one or more image sensors (for example, a front sensor or a rear sensor), a lens, an image signal processor (ISP), or a flash (for example, an LED or a xenon lamp).

The power management module 295 may manage, for example, the power of the electronic device 201. According to an embodiment of the present disclosure, the power management module 295 may include a power management integrated circuit (PMIC), a charger IC, or a battery gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the remaining charge of the battery 296 and a voltage, current, or temperature of the battery 296 while charging. The battery 296 may include, for example, a rechargeable battery and/or a solar battery.

The indicator 297 may indicate a certain state (for example, a booting state, a message state, a charging state, and the like) of the electronic device 201 or a part (for example, the processor 210) thereof. The motor 298 may convert an electrical signal into a mechanical vibration and may generate a vibration, a haptic effect, or the like. The electronic device 201 may include a mobile TV support device (for example, a GPU) that can process media data according to a standard, such as digital multimedia broadcasting (DMB), digital video broadcasting (DVB), MediaFlo™, and the like. Each of the above-described component elements of hardware according to the present disclosure may be configured with one or more components, and the names of the corresponding component elements may vary based on the type of electronic device. According to an embodiment of the present disclosure, the electronic device 201 may not include some elements, or may further include additional elements. Some elements may be coupled to constitute one object, but the electronic device may perform the same functions as those of the corresponding elements before being coupled to each other.

Figure 3:
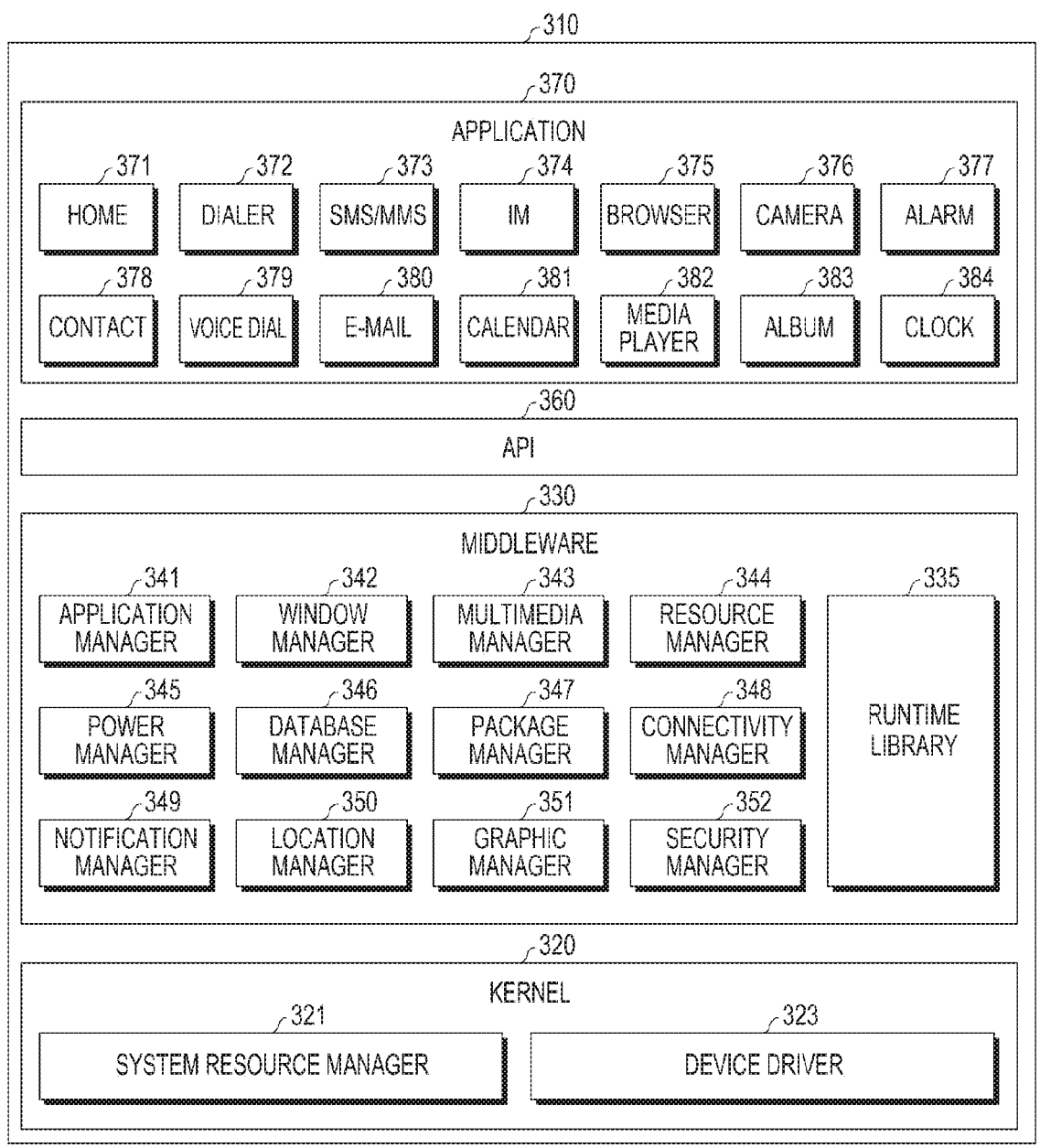
FIG. 3 is a block diagram of a program module according to an embodiment of the present disclosure.

FIG. 3 is a block diagram of a program module 310 according to an embodiment of the present disclosure.

Referring to FIG. 3, the program module 310 (for example, the program 140) may include an OS that controls resources relating to an electronic device (for example, the electronic device 101) and/or various applications (for example, the application programs 147) that are driven on the OS. The OS may include, for example, Android®, iOS®, Windows®, Symbian®, Tizen®, or Bada™. The program module 310 may include a kernel 320 (for example, the kernel 141), middleware 330 (for example, the middleware 143), an API 360 (for example, the API 145), and/or application 370 (for example, the application programs 147). At least a part of the program module 310 may be preloaded on the electronic device, or may be downloaded from an external electronic device.

The kernel 320 may include, for example, a system resource manager 321 and/or a device driver 323. The system resource manager 321 may control, allocate, or retrieve system resources. According to an embodiment of the present disclosure, the system resource manager 321 may include a process manager, a memory manager, or a file system manager. The device driver 323 may include, for example, a display driver, a camera driver, a BT driver, a shared memory driver, a USB driver, a keypad driver, a WiFi driver, an audio driver, or an inter-process communication (IPC) driver.

The middleware 330 may provide, for example, a function required by the application 370 in common, or may provide various functions to the application 370 through the API 360 such that the application 370 can efficiently use limited system resources within the electronic device. According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the application 370 is being executed. The runtime library 335 may manage input/output, manage memory; or process arithmetic functions.

The application manager 341 may manage, for example, the life cycles of the application 370. The window manager 342 may manage GUI resources used for a screen. The multimedia manager 343 may identify formats required for reproducing various media files and may encode or decode a media file using a codec suitable for the corresponding format. The resource manager 344 may manage the source code of the application 370 or the space in memory. The power manager 345 may manage, for example, the capacity or power of a battery and may provide power information required for operating the electronic device. According to an embodiment of the present disclosure, the power manager 345 may operate in conjunction with a basic input/output system (BIOS). The database manager 346 may, for example, generate, search, or change databases to be used by the application 370. The package manager 347 may manage the installation or update of an application that is distributed in the form of a package file.

The connectivity manager 348 may manage, for example, a wireless connection. The notification manager 349 may provide an event (for example, an arrival message, an appointment, a proximity notification, or the like) to a user. The location manager 350 may manage, for example, the location information of the electronic device. The graphic manager 351 may manage a graphic effect to be provided to a user and a user interface relating to the graphic effect. The security manager 352 may provide, for example, system security or user authentication. According to an embodiment of the present disclosure, the middleware 330 may include a telephony manager for managing a voice or video call function of the electronic device or a middleware module that is capable of forming a combination of the functions of the above-described elements. The middleware 330 may provide an OS-specific module. Furthermore, the middleware 330 may dynamically remove some existing elements, or may add new elements. The API 360 is, for example, a set of API programming functions, and may be provided with different configurations depending on the OS. For example, with respect to each platform, one API set may be provided in the case of Android® or iOS®, and two or more API sets may be provided in the case of Tizen®.

The application 370 may include, for example, one or more applications that can perform functions such as a home application 371, a dialer application 372, an SMS/MMS application 373, an instant messaging (IM) application 374, a browser application 375, a camera application 376, an alarm application 377, a contact application 378, a voice dial application 379, an e-mail application 380, a calendar application 381, a media player application 382, an album application 383, a clock application 384, health-care applications (for example, for measuring a quantity of exercise or a blood glucose level), environmental information (for example, atmospheric pressure, humidity, or temperature information) provision applications, and the like. According to an embodiment of the present disclosure, the application 370 may include an information exchange application that can support the exchange of information between the electronic device and an external electronic device. The information exchange application may include, for example, a notification relay application for relaying certain information to an external electronic device or a device management application for managing an external electronic device. For example, the notification relay application may relay notification information generated in the other applications of the electronic device to an external electronic device, or may receive notification information from an external electronic device and provide the received notification information to a user. The device management application may install, delete, or update the functions of an external electronic device that communicates with the electronic device (for example, turning on/off the external electronic device itself (or some elements thereof) or adjusting the brightness (or resolution) of a display) or applications executed in the external electronic device.

According to an embodiment of the present disclosure, the application 370 may include applications (for example, a health care application of a mobile medical appliance) that are designated according to the attributes of an external electronic device. The application 370 may include applications received from an external electronic device. At least some of the program module 310 may be implemented (for example, executed) by software, firmware, hardware (for example, the processor 210), or a combination of two or more thereof, and may include a module, a program, a routine, an instruction set, or a process for performing one or more functions.

Figure 4:
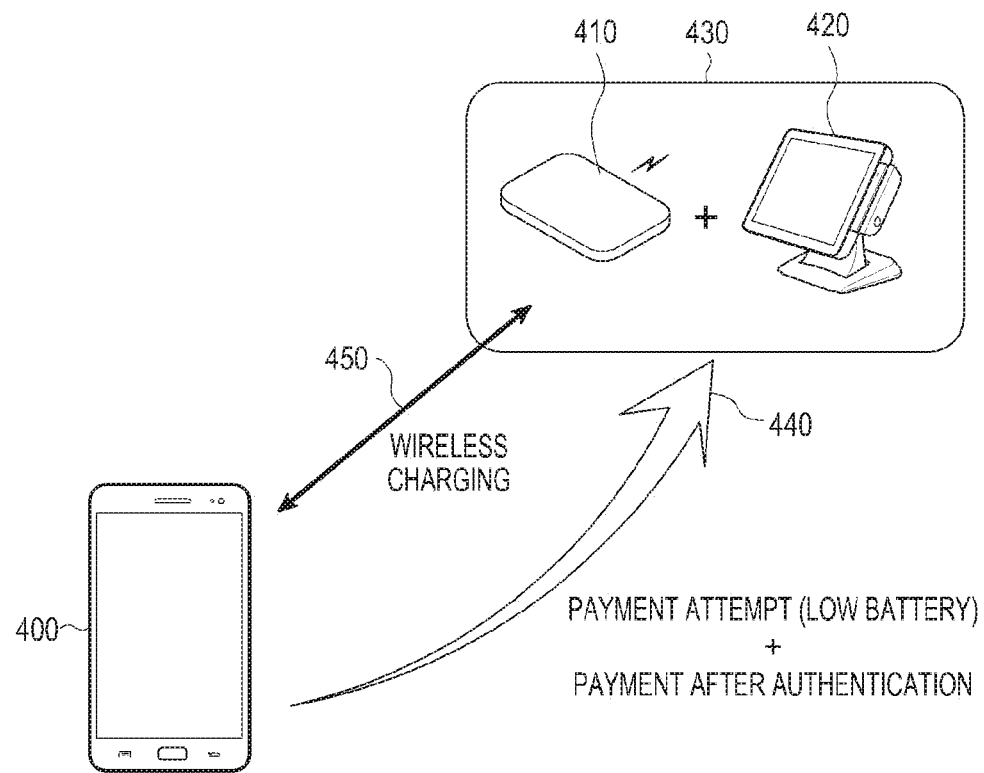
FIG. 4 is an illustration of a mobile payment method in a wireless payment system according to an embodiment of the present disclosure.

FIG. 4 is an illustration of a mobile payment method in a wireless payment system according to an embodiment of the present disclosure.

Referring to FIG. 4, a wireless payment system 430 may include a wireless charger 410 connected to communicate with an external payment device 420. For example, the external payment device 420 is a device capable of processing payment by linking with a payment application set in an electronic device 400, and may include a POS terminal. The external payment device 420 may be a POS terminal including a memory and an operation module for managing products to be sold in real time, but is not necessarily limited thereto. Further, the external payment device 420 may receive payment information including information on a payment means and identification information of the electronic device 400 from the electronic device 400, and when payment authentication for the electronic device 400 is identified, process the payment with a payment server. The external payment device 420 may perform a function of performing control to pay the corresponding cost through the payment server by transmitting the payment information to the payment server. The external payment device 410 may provide a function of displaying a payment amount, a payment progress state, and a payment result, and may provide the electronic device 400 with a mobile payment processing result through a link with the external payment server.

When the electronic device 400 performs mobile payment in a low-battery state, the user may tag or put the electronic device 400 on the external payment device 420 in a non-contact manner. Through the mobile payment attempt, the payment information (for example, the information on the payment means) stored in the electronic device 400 may be transmitted to the external payment device 420. In this case, a minimum amount of power required for the mobile payment is not available in the electronic device 101, so that low-battery state information 440 may be transmitted to the external payment device 420 at the time of the mobile payment attempt.

For example, if the low-battery state is recorded in an RFID tag when the electronic device 400 enters the low-battery state and then the electronic device 400 is tagged on the external payment device 420 in a non-contact manner for payment, the low-battery state information recorded in the RFID tag may be transmitted to the external payment device 420. In this case, the external payment device 420 may include an RFID module that may perform short-range communication with the electronic device 400. Accordingly, the external payment device 420 may receive mobile payment-related information from the electronic device 400 through the RFID module, and may receive battery state information.

When the electronic device 400 attempts the mobile payment in the low-battery state, the external payment device 420 may make a request for starting wireless charging to the wireless charger 410 before performing the mobile payment using the payment information received from the electronic device 400. In response to the request, the wireless charging 450 may be performed between the electronic device 400 and the wireless charger 410.

When the power state of a charged battery reaches the amount of power required for the mobile payment while the electronic device 400 is being charged through the wireless charger 410, the electronic device 400 may perform the payment through the external payment device 420 after user authentication. For example, when the power state of the charged battery reaches the amount of power required for mobile payment, the electronic device 500 may inform the user that the electronic device 500 is sufficiently charged to perform the mobile payment, receive authentication information from the user, and then perform the payment.

Further, when the external payment device 420 receives a signal indicating that the user authentication has been completed from the electronic device 400 or is informed that the electronic device 500 has reached the amount of power required to perform mobile payment from the wireless charger 410, the external payment device 420 may transmit payment information provided from the electronic device 400 to the external payment server and perform the payment. When the mobile payment is successful, the external payment device 420 may transmit payment success information to the electronic device 400. In contrast, when the mobile payment fails, the external payment device 420 may transmit payment failure information to the electronic device 400, so that the electronic device may perform the mobile payment process again by transmitting the payment information again or making the user input the authentication information again.

As described above, according to the present disclosure, when the user puts the electronic device 400 on the external payment device 420 in a state where there is little power left in the electronic device 400, the payment application may be automatically executed for the mobile payment, and wireless charging by the wireless charger 410 may be performed.

Figures 5A, 5B:
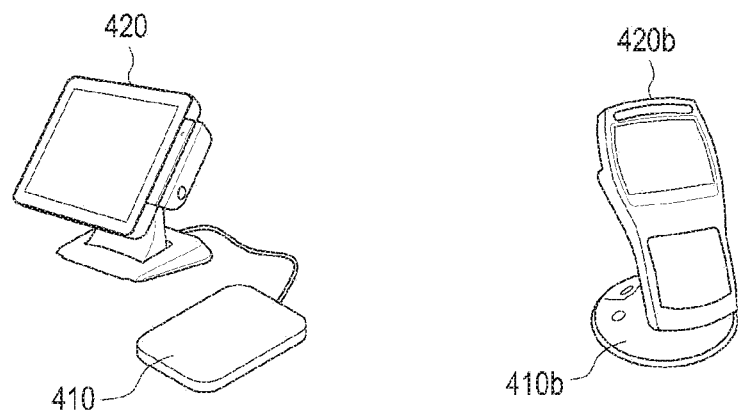
FIGS. 5A and 5B are illustrations of a wireless charger and an external payment device connected to communicate with the wireless charger according to an embodiment of the present disclosure.

FIGS. 5A and 5B are illustrations of a wireless charger 410 and an external payment device 420 and 420b connected to communicate with the wireless charger 410 according to an embodiment of the present disclosure.

Referring to FIG. 5A, a stand-type external payment device 420 is illustrated. When the external payment device 420 includes an MST type external payment device therein, the external payment device 420 may receive information on a selected payment means (for example, credit card information) from the electronic device 400 through an MST reader. Further, the external payment device 420 may also include an NFC type external payment device therein, as well as the MST type external payment device, and in the NFC type external payment device, may receive information on a selected payment means from the electronic device 400 through an NFC reader.

As illustrated in FIG. 5A, the external payment device 420 may be connected to communicate with the wireless charger 410 through an input/output interface of the external payment device 420, for example, a USB port. Alternatively, the external payment device 420 may also be connected to the wireless charger 410 through a wireless communication scheme such as BT or WiFi. Alternatively, the external payment device 420 may be implemented to be equipped with the wireless charger 410 therein.

Referring to FIG. 5B, a portable external payment device 420b is illustrated. The external payment device 420b may support both the MST type external payment device and the NFC type external payment device regardless of its form, and may perform a payment through communication with the electronic device 400 in the MST type external payment device or the NFC type external payment device. For example, the external payment device 420b in the NFC type external payment device may be set in a reader mode to acquire payment information registered in the electronic device 400 from an NFC module (unit) of the electronic device 400, and may be set in a peer-to-peer (P2P) mode to perform mutual communication. Alternatively, the external payment device 420b may communicate with the electronic device 400 through BT. Further, the external payment device 420b may come into contact with a wireless charger 410b while being held on the wireless charger 410b, or the wireless charger 410b may be embedded into the external payment device 420b.

As illustrated in FIGS. 5A and 5B, the electronic device 400 may perform payment with the external payment devices 420 and 420b through one of the MST type external payment device and the NFC type external payment device. For communication with the external payment devices 420 and 420b, the electronic device 400 may include at least one of an NFC module, a MST module, and a BT module.

Internal elements included in the electronic device 400, the wireless charger 410, and the external payment device 420 are described below in more detail with reference to FIG. 6.

Figure 6:
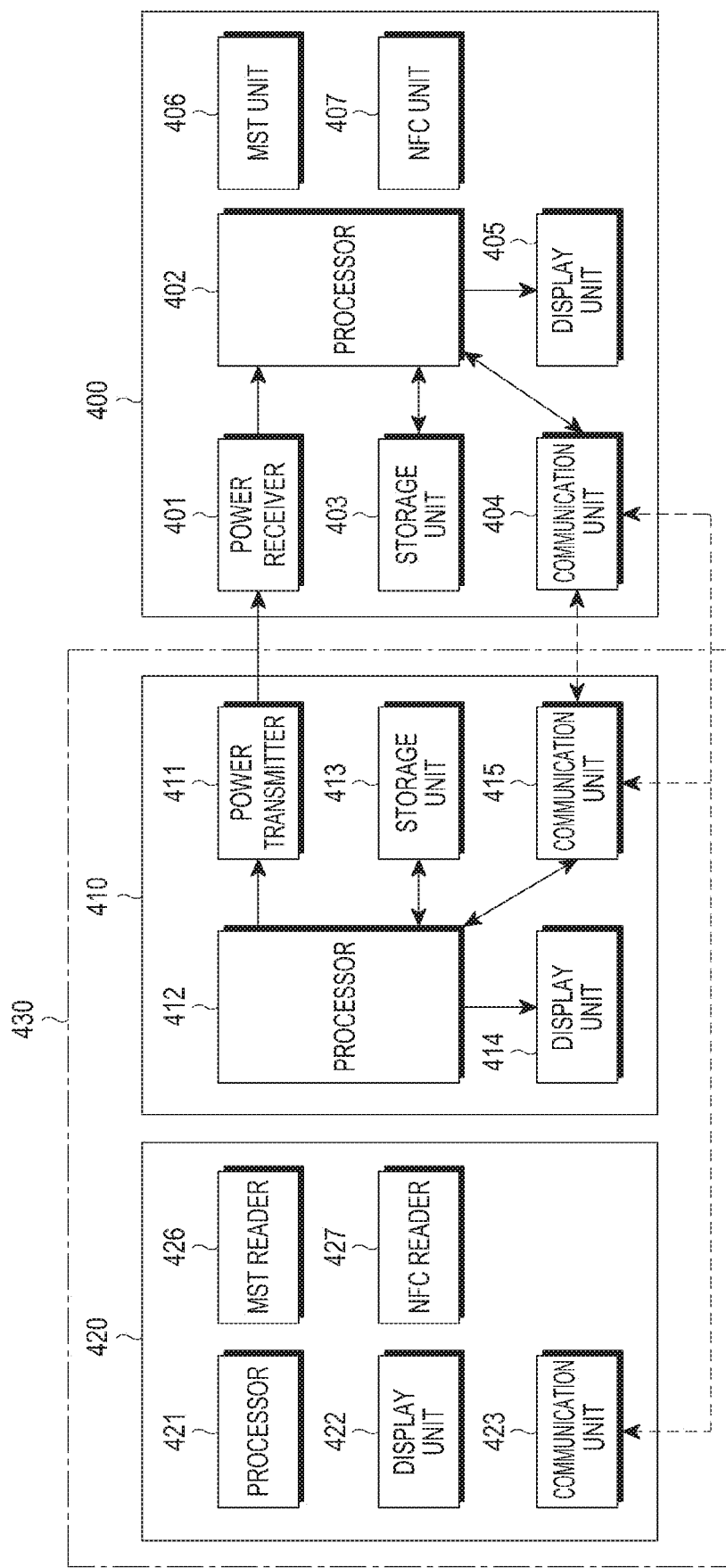
FIG. 6 is a block diagram of a wireless payment system including an electronic device that performs a mobile payment according to an embodiment of the present disclosure.

FIG. 6 is a block diagram illustrating a wireless payment system 430 including an electronic device that performs mobile payment according to an embodiment of the present disclosure.

As illustrated in FIG. 6, the wireless payment system 430 may include the wireless charger 410 and the payment device 420. Further, the wireless charger 410 may include at least one of a power transmitter 411, a processor 412, a storage unit 413, a display unit 414, and a communication unit 415. The payment device 420 may include a processor 421, a display unit 422, a communication unit 423, and at least one of an MST reader 426 and an NFC reader 427. The NFC reader 427 may operate according to an NFC communication system, and, for example, may generate an RF field. According an embodiment of the present disclosure, the NFC reader 427 may receive an NFC signal from an NFC unit 407 of the electronic device 400. The MST reader 426 may operate according to an MST communication type payment device, and may receive a communication-related signal from the MST unit 406 of the electronic device 400. For example, the MST unit 406 may transmit an MST signal by changing a magnetic field.

The power transmitter 411 may provide power required by the wireless charger 410 and wirelessly provide power to the electronic device 400. The power transmitter 411 may supply power in an alternating current (AC) waveform, or convert power in a direct current (DC) waveform to power in an AC waveform using an inverter and supply the power in an AC waveform. The power transmitter 411 may be implemented in the form of an embedded battery or in the form of a power reception interface so as to receive power externally and supply the power to other elements. It will be easily understood by those skilled in the art that there is no limitation on the power transmitting unit 411 if it is a means that can supply power in a constant AC waveform. For example, when a resonance scheme is adopted, it is preferable that the distance between the wireless charger 410 and the electronic device 400 be 30 m or less. When an electromagnetic induction scheme is adopted, the distance between the wireless charger 410 and the electronic device 400 may be 10 cm or less.

The processor 412 may control the overall operation of the wireless charger 410. The processor 412 may control the overall operation of the wireless charger 410 through an algorithm, a program, or an application that is required for the control and is read from the storage unit 413. The processor 412 may be implemented in the form of a CPU, a microprocessor, or a mini computer. Accordingly, the processor 412 may be referred to as a controller or a micro controlling unit (MCU) depending on the implementation.

The communication unit 415 may communicate with the electronic device 400 in a predetermined scheme. The communication unit 415 may receive power information from the electronic device 400. The power information may include at least one of a capacity of the electronic device 400, a remaining battery charge, the number of times the electronic device 400 is charged, a battery capacity, and a percentage of battery charge remaining.

Further, the communication unit 415 may transmit a charging function control signal for controlling a charging function of the electronic device 400. The charging function control signal may be a control signal for enabling or disabling the charging function by controlling a power receiver 401 of the electronic device 400. The communication unit 415 may also receive a signal from the payment device 420 as well as from the electronic device 400.

According to an embodiment of the present disclosure, the communication unit 415 may include an RFID module for reading battery state information recorded in the RFID tag of the communication unit 404 of the electronic device 400. The battery state information of the electronic device 400 may be read through the RFID module of the communication unit 415. The RFID tag may be implemented as a passive antenna that consumes little or no current. The RFID module may read the RFID tag indicating the battery state of the electronic device 400 within a range from several centimeters to several meters, so that a user can read the battery state information if the user brings the electronic device 400 close to the payment device 420 or puts the electronic device 400 on the payment device 420 to make a payment.

The processor 412 may identify the battery state of the electronic device 400 based on the read battery state information. Accordingly, the processor 412 may recognize that the remaining battery charge is less than the minimum power required for mobile payment. Further, the communication unit 415 may inform the electronic device 410 that wireless charging is needed for the mobile payment by transmitting the read battery state information to the processor 421 through the communication unit 423 of the payment device 420. In response, the payment device 410 may instruct the wireless charger 410 to start wireless charging with the electronic device 400.

The processor 412 may display the state of the electronic device 400 on the display unit 414 based on a message received from the electronic device 400 through the communication unit 415. Further, the processor 412 may display, on the display unit 414, a time expected to be taken until the electronic device 400 is fully charged.

As illustrated in FIG. 6, the electronic device 400 may include at least one of the power receiver 401, a processor 402, a storage unit 403, a display unit 405, and a communication unit 404. The electronic device 400 may further include at least one of an MST unit 406 and an NFC unit 407 for a mobile payment.

The power receiver 401 may wirelessly receive power transmitted from the wireless charger 410. The power receiver 401 may receive power in an AC waveform.

The processor 402 may control the overall operation of the electronic device 400. The processor 402 may control the overall operation of the wireless power receiver 401 through an algorithm, a program, or an application that is required for the control and is read from the storage unit 403. The processor 402 may be implemented in the form of a CPU, a microprocessor, or a mini computer.

According to an embodiment of the present disclosure, the processor 402 may acquire information on an amount of power consumed by a mobile payment, update the information on the amount of power consumption according to a payment type based on the acquired information on the amount of power, and store the updated information in the storage unit 403. The power consumption of the electronic device 400 may vary depending on the payment type, but may also vary depending on a card authentication scheme used by users in respective countries, even if the payment type is the same. In addition, even for electronic devices of the same type, the performance of the electronic device may vary depending on the use pattern of the user, and accordingly, the amount of power required for payment may be different.

Therefore, the processor 402 may calculate the number of times a payment can be performed according to a battery power state based on information on power consumption through the payment type stored in the storage unit 403. The processor 402 may perform control to output a payment progress state, including the calculated number of times that a payment can be performed, to the display unit 405. When the payment result is output to the display unit 405 after a payment, the processor 402 may perform control to calculate the number of times further payments can be performed based on the remaining battery charge, along with the payment result.

The communication unit 404 may communicate with the wireless charger 410 through a predetermined scheme. The communication unit 404 may transmit power information to the wireless charger 410. The power information may include at least one of a capacity of the electronic device 400, a remaining battery charge, the number of times the electronic device 400 has been charged, a battery capacity, and a battery charge percentage.

Further, the communication unit 404 may transmit a charging function control signal for controlling the charging function of the electronic device 400. The charging function control signal may be a control signal for enabling or disabling the charging function by controlling the power receiver 401 of the electronic device 400. According to an embodiment of the present disclosure, the communication unit 404 may include at least one of an NFC unit 407, an MST unit 406, and a BT module for communication with the payment device 420. For example, the communication unit 404 may be connected to the communication unit 423 of the payment device 420, and may serve to indicate the need for wireless charging or exchange a message or a signal such as a charging progress state or payment-related information.

The processor 402 may display the payment progress state and the charging progress state of the electronic device 400 on the display unit 405 by controlling the display unit 405. According to an embodiment of the present disclosure, when the mobile payment is performed with the payment device 420, the processor 402 may inform the payment device 420 of the need of wireless charging through the communication unit 415 of the wireless charger 410.

According to an embodiment of the present disclosure, for the mobile payment with the payment device 420, the processor 402 may perform control to identify the power state of the battery in the electronic device 400, when the power state of the battery is within a first range, receive power from the wireless charger 410 connected to communicate with the payment device 420, and when the power state of the battery is within a second range according to reception of power from the wireless charger 410, perform the mobile payment through the payment device 420.

Further, the processor 402 may display, on the display unit 405, a payment progress state and a mobile payment result as well as a charging progress state including a time expected to be spent until the electronic device 400 is charged with a minimum amount of power required for a mobile payment.

In response to a request for the mobile payment from the communication unit 404 of the electronic device 400, when the power state of the battery of the electronic device 400 is within the first range, the processor 421 of the payment device 420 may make a request for performing wireless charging with the electronic device to the communication unit 415, and when the power state of the battery is within the second range as the power receiver 401 receives power from the power transmitter 411 of the wireless charger 410, perform a mobile payment through the communication unit 423.

The communication unit 423 corresponds to a communication interface connected to the communication unit 415 of the wireless charger 410 through a wire or wirelessly, and may communicate with the electronic device 400 for a mobile payment. The communication unit 423 may include at least one of an NFC module, an MST module, and a BT module for communication with the electronic device 400.

In the connection through the communication unit 415 of the wireless charger 410, the processor 421 may receive a message that indicates a start of wireless charging from the communication unit 415, and may receive a message that indicates a wireless charging progress state through the communication unit 415 while the wireless charging is being performed. Further, when the processor 421 receives a message that indicates a charging state in which the mobile payment can be performed through the communication unit 415 of the wireless charger 410 or the communication unit 404 of the electronic device 400, the processor 421 may display a payment result on the display unit 422 via an approval process for the final payment amount.

Figure 7:
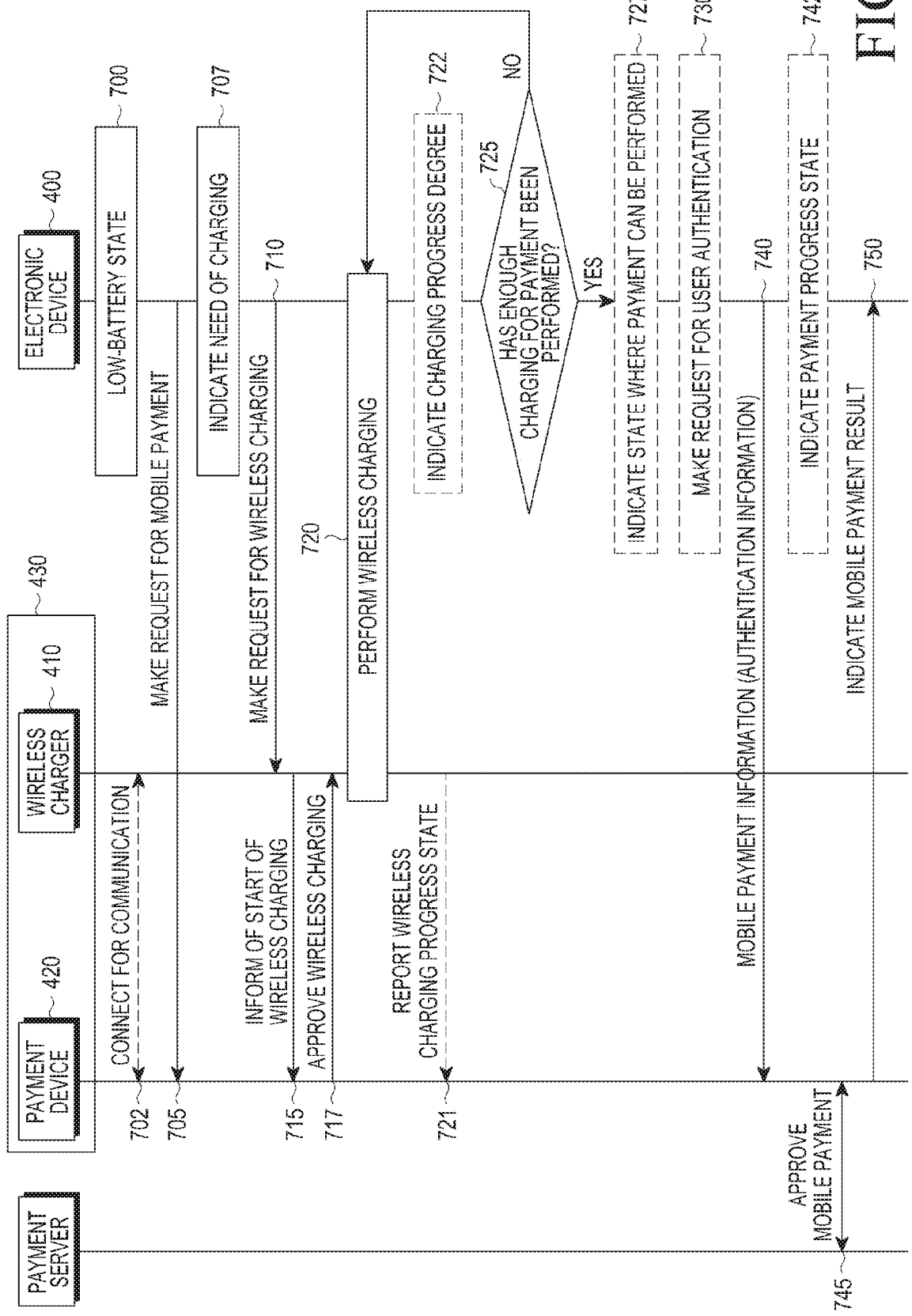
FIG. 7 is a flowchart of a mobile payment method between elements of a wireless payment system according to an embodiment of the present disclosure.

FIG. 7 is a flowchart of a mobile payment method between elements of the wireless payment system according to an embodiment of the present disclosure.

Referring to FIG. 7, the electronic device 400 is in a low battery state in step 700 corresponding to a minimum battery charge or lower designated for the mobile payment, and that the payment device 420 is in a communication-connected state in step 702 with the wireless charger 410. In the low-battery state, as the electronic device 400 executes a payment application, a mobile payment request in step 705 may be transmitted to the payment device 420. Since the electronic device 400 is in a low-battery state, in which the battery does not have the minimum charge required for a mobile payment, the electronic device 400 may display information indicating the need for charging on the display or output a warning sound to inform the user of the situation in step 707.

In this case, the user may tag or put the electronic device 400 on the payment device 420 in a non-contact manner for a mobile payment. Then, the electronic device 400 enters a range within which the wireless charging is possible, and thus a request for wireless charging may be transmitted to the wireless charger 410 in step 710. In response to the request, the wireless charger 410 may inform the payment device 420 of the start of wireless charging in step 715. When the wireless charger 410 receives approval for wireless charging from the payment device 420 in step 717, the wireless charging may be performed between the wireless charger 410 and the electronic device 400 in step 720. In this case, the payment device 420 may wait until the minimum power for the mobile payment is charged to receive a mobile payment signal from the electronic device 420. The mobile payment signal may correspond to a payment signal that is transmitted after the user authentication in the electronic device 400.

In addition, the wireless charging process between the wireless charger 410 and the electronic device 400 in step 720 may be performed as described below. When a load change due to the arrangement of the electronic device 400 is detected in the wireless charger 410, the electronic device 400 may receive a search signal for discovering a target to receive wireless power from the wireless charger 410. When the search signal is received, the electronic device 400 may transmit a response signal, and the response signal may form the connection between the wireless charger 410 and the electronic device 400. Accordingly, the wireless charger 410 may enter a power transmission mode and transmit charging power to the electronic device 400.

In response to the wireless charging process, the electronic device 400 may identify the power state of the battery according to the reception of the power from the wireless charger 410. Accordingly, the electronic device 400 displays a charging progress degree on the display and thus inform the user of the charging progress situation for the mobile payment in step 722. Further, the wireless charger 410 may report the charging progress state to the payment device 420 in step 721. A method of informing the user of the charging progress situation for the mobile payment is described below in greater detail.

In addition, based on the power state of the battery, identified based on the charging progress, the electronic device 400 may determine whether sufficient charging for payment has been performed in step 725. When sufficient charging for payment has been performed, that is, when the battery reaches the minimum battery charge required for mobile payment, the electronic device 400 may indicate the state in which payment is possible in step 727, and may then make a request for user authentication in step 730.

Although it is illustrated that the request for the user authentication is made when sufficient charging for payment has been performed in step 725, the request for user authentication may be made after the request for mobile payment in step 705, and the time at which the request for user authentication information is made is not limited thereto. The time of the request for user authentication may vary depending on the mobile payment type or the battery charging state. The user authentication information may indicate information input by the user to reduce the risk of unauthenticated use in the payment. For example, the user authentication information may include user fingerprint information.

When the user authentication information is input in response to the request for user authentication, the electronic device 400 may transmit payment information for the mobile payment to the payment device 420 in step 740. In this case, in step 740, the payment information for the mobile payment may include information on a payment means and identification information of the electronic device 400, and may further include the user authentication information. The information on the payment means may be transmitted when the request for mobile payment is made in step 705, but may be implemented so as to be transmitted to the payment device 420 after sufficient charging for payment has been performed.

In addition, the payment device 420 waits for the charging of minimum power for the mobile payment, and when receiving a mobile payment signal from the electronic device 400, may perform a mobile payment approval operation with the payment server in step 745. In this case, during the mobile payment approval operation, the electronic device 400 may inform the user of a payment progress state in step 742, and the payment device 420 may notify the electronic device 400 of a mobile payment result in step 750 by performing the mobile payment approval operation with the payment server in step 745.

According to an embodiment of the present disclosure described above, an electronic device in a low-battery state may perform the mobile payment while being wirelessly charged with the minimum amount of power required for the mobile payment.

Figure 8:
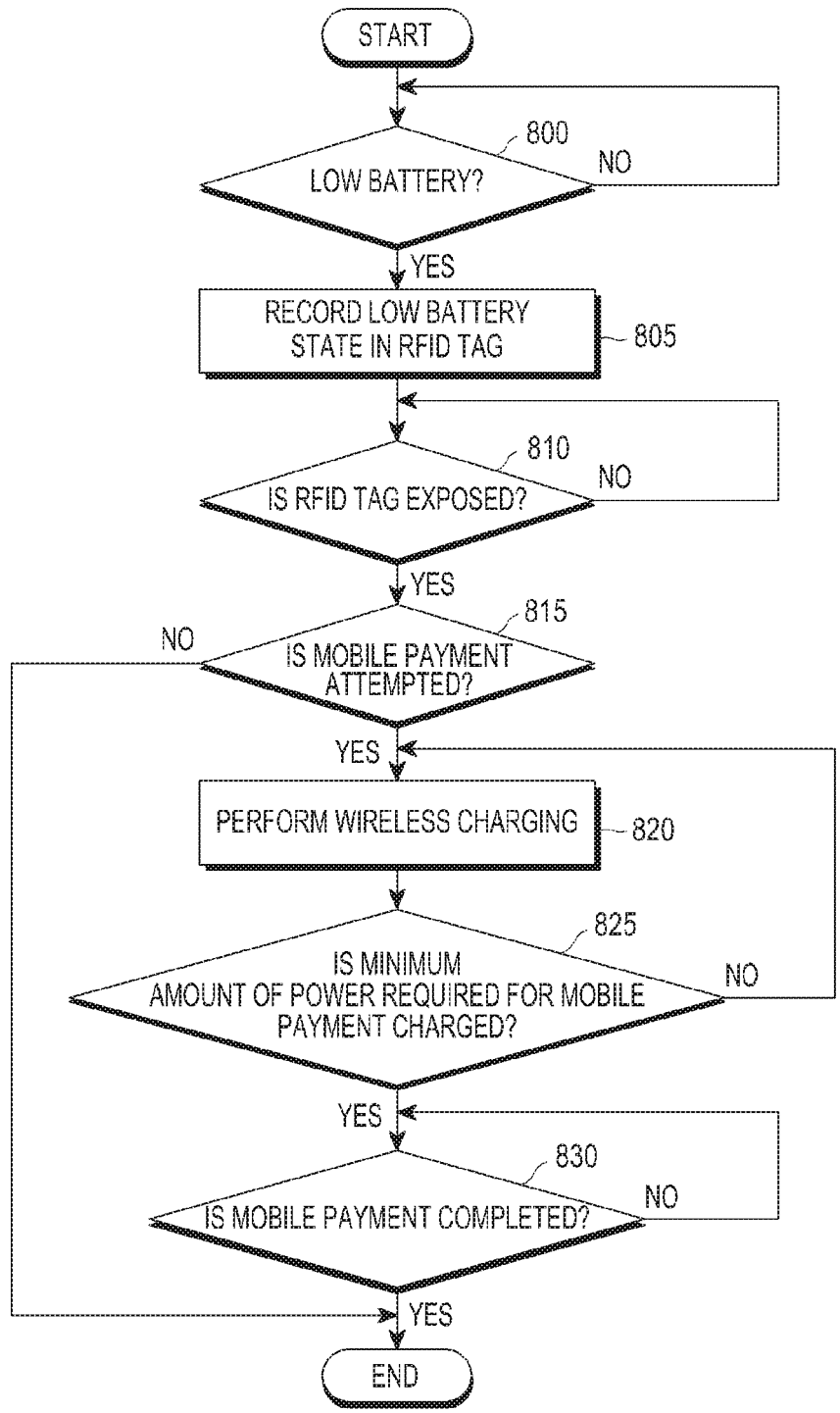
FIG. 8 is a flowchart of a mobile payment method by an electronic device according to an embodiment of the present disclosure.

FIG. 8 is a flowchart of an operation of a mobile payment method by an electronic device 400 according to an embodiment of the present disclosure.

Referring to FIG. 8, the electronic device 400 may determine whether the electronic device 400 enters a low-battery state in step 800. When the electronic device 400 enters the low-battery state, the electronic device 400 may record information about the low-battery state in an RFID tag in step 805. When the user brings the electronic device 400 close to the payment device 420 or puts the electronic device 400 on the payment device 420 for a mobile payment in a state where the low-battery state is recorded in the RFID tag, the payment device 420 may read the low-battery state information from the electronic device 400 through an RFID module.

Accordingly, the electronic device 400 may determine whether the RFID tag is read by the RFID module of the payment device 420, that is, whether the RFID tag is exposed, in step 810. When there is an attempt at mobile payment in step 815 in a state in which the RFID tag is exposed, the electronic device 400 may perform wireless charging with the wireless charger 410 in step 820. In this case, since the payment device 420 is made aware of the low-battery state of the electronic device 400 through the RFID module, the payment device 420 may instruct the wireless charger 410 to perform wireless charging with the electronic device 400. Accordingly, as the electronic device 400 receives power from the wireless charger 410, the electronic device 400 may determine whether a minimum amount of power required for the mobile payment is charged in step 825. When the minimum amount of power is charged, the electronic device 400 may determine whether the mobile payment with the payment device 420 is completed in step 830 by performing a payment function. When the mobile payment is completed, the electronic device 400 may output a payment result through a screen.

In addition, a wireless charging process between the electronic device 400 and the wireless charger 410 may be largely divided into a type that requires a process of making a request for payment to the payment device 420 before transmitting payment information for actual payment approval and a type that does not require the process of making the request for payment based on a mobile payment type, which is described below in greater detail with reference to FIGS. 9A and 9B.

Figure 9A:
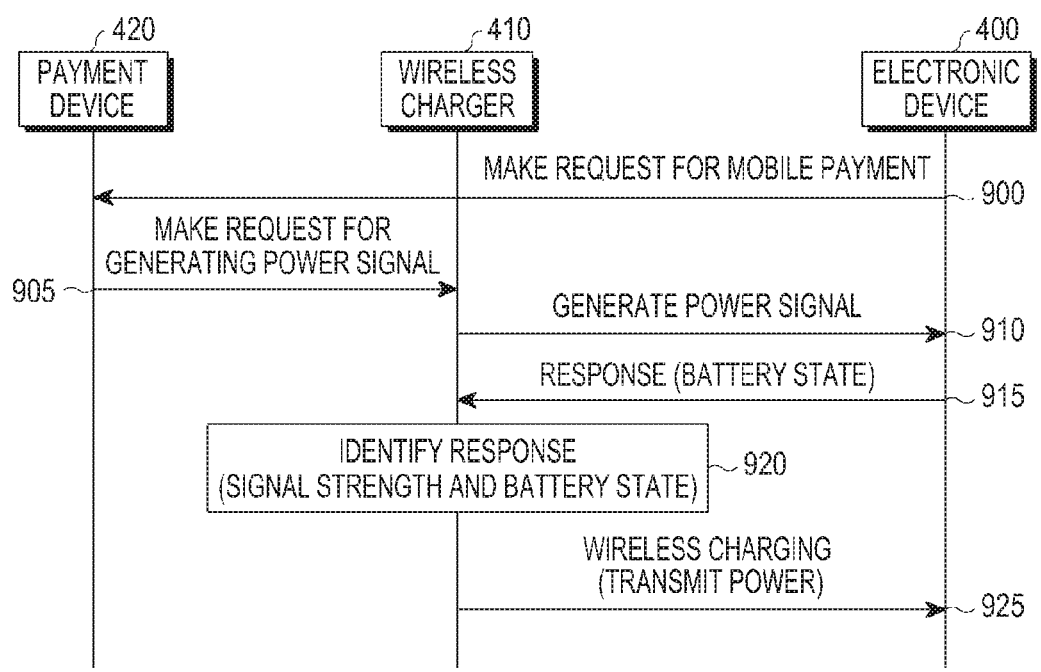
FIGS. 9A and 9B are flow diagrams of a wireless charging method between elements of a wireless payment system according to an of the present disclosure.
Figure 9B:
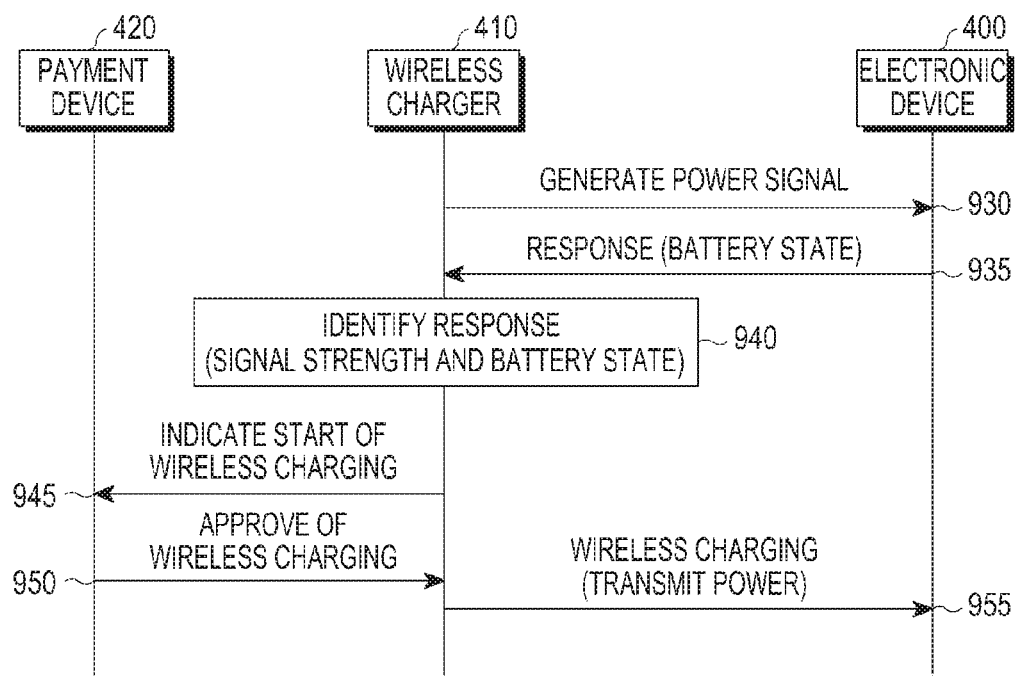

FIGS. 9A and 9B are flow diagrams of a wireless charging method between elements of a wireless payment system according to an embodiment of the present disclosure. FIG. 9A illustrates the wireless charging process after the electronic device 400 makes a request for a mobile payment to the payment device 420, and FIG. 9B illustrates the wireless charging process without the request for the mobile payment from the electronic device 400.

Referring to FIG. 9A, the electronic device 400 may make a request for mobile payment to the payment device 420 in step 900. The payment device 420 may make a request for transmitting a power signal to the electronic device 400 to the wireless charger 410 in response to the request for mobile payment in step 905. Accordingly, the wireless charger 410 may transmit the power signal to the electronic device 400 in response to the request from the payment device 420 in step 910, and may receive a response including information on a battery state from the electronic device 400 in step 915.

The wireless charger 410 may identify information on a signal strength and a battery state by checking information included in the response in step 920. The wireless charger 410 may determine the power to be transmitted to the electronic device 400 based on information included in the response, and may perform wireless charging by transmitting the power in step 925. In this case, when transmitting the response to the wireless charger 410, the electronic device 400 may set the amount of power that can be currently received to be greater, and may inform the wireless charger 410 of the set power as well as the maximum power that the electronic device 400 can receive. Accordingly, fast charging for mobile payment is possible, and thus a charging time for charging the minimum amount of power required for the mobile payment can be reduced. Therefore, a standby time for the mobile payment can be reduced and the mobile payment result can be immediately provided to a user, which improves convenience of use.

Referring to FIG. 9B, although the user brings the electronic device 400 in the low-battery state close to the payment device 420 or brings the electronic device 400 into contact with the payment device 420, the payment device 420 has not received a request for mobile payment, and thus may not be aware of the low-battery state of the electronic device 400. However, when the user brings the electronic device 400 close to the payment device 420 or brings the electronic device 400 into contact with the payment device 420, the wireless charger 410 may detect a load change and generate a power signal for detecting a target to receive power in step 930.

When the electronic device 400 transmits a response including battery state information in response to the detection signal in step 935, the wireless charger 410 may identify a signal strength and a battery state of the electronic device 400 by checking the response in step 940. Accordingly, the wireless charger 410 may know that the electronic device 400 must be charged.

In this case, in order to prevent the wireless charger 410 from charging all nearby electronic devices, the wireless charger 410 may inform the payment device 420 of the start of wireless charging with the electronic device 400 in step 945, receive a wireless charging approval in step 950, and then perform the wireless charging with the electronic device 400 in step 955. As described above, the payment device 420 allows the wireless charger 410 to transmit power only to the electronic device 400, which will actually perform the mobile payment, thereby performing efficient wireless charging.

In addition, even when the minimum amount of power required for mobile payment is available, the payment system 430 may perform payment during wireless charging. When receiving a disabled control signal from the wireless charger 410, the electronic device 400 may stop receiving power by opening a switch. However, the electronic device 400 continuously receives power when a charging function is not disabled, so a signal pertaining to the wireless charging and a signal pertaining to the payment may be output at the same time. Accordingly, it is required to consider a method of avoiding interference between a signal pertaining to wireless charging and a signal pertaining to a payment. The method of avoiding interference between a signal pertaining to wireless charging and a signal pertaining to a payment may be largely divided into a temporal separation method and a spatial separation method.

Figure 10:
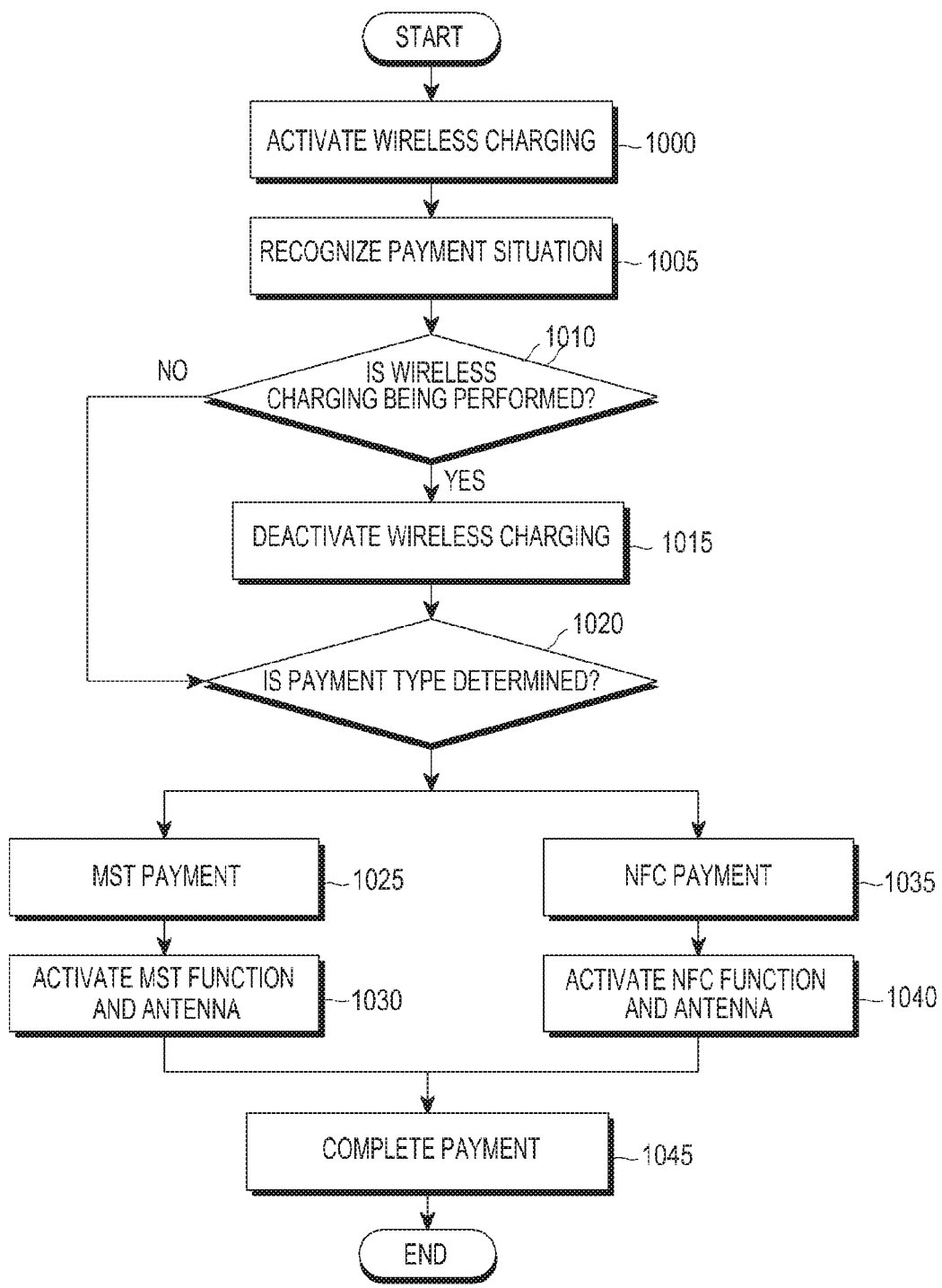
FIG. 10 is a flowchart of a method of separating and performing a wireless charging operation and a payment operation by an electronic device according to an embodiment of the present disclosure.

FIG. 10 is a flowchart of an operation of separating and performing a wireless charging operation and a payment operation by an electronic device according to an embodiment of the present disclosure. FIG. 10 illustrates a method of preventing interference between a signal pertaining to wireless charging and a signal pertaining to payment based on a temporal separation method.

Referring to FIG. 10, the electronic device 400 may recognize a payment situation in step 1005 in a state in which wireless charging is activated in step 1000. For example, when the electronic device 400 reaches a charging state where the minimum amount of power required for a mobile payment is charged while receiving power from the wireless charger 410, the electronic device 400 may recognize the situation where actual payment should be performed. Accordingly, the electronic device 400 determines whether the wireless charging is performed in step 1010, and when the wireless charging is performed, deactivates the wireless charging in step 1015 and then determines the payment type in step 1020.

The payment type may be determined in consideration of the kind of payment device 420. When the payment device 420 is an MST-type payment device, the electronic device 400 may perform an MST payment in step 1025 and activate an MST function and an antenna in step 1030. In contrast, when the payment device 420 is an NFC-type payment device, the electronic device 400 may perform an NFC payment in step 1035 and activate an NFC function and an antenna in step 1040. Accordingly, the electronic device 400 may complete the payment based on the activated payment type in step 1045.

In addition, in the determination of the payment type in step 1020, when the electronic device 400 does not know the payment type of the payment device 420, or when the payment device 420 supports both payment types, the electronic device 400 should determine the payment type through which payment is to be performed. To this end, when the electronic device 400 transmits an NFC signal and then the payment is not completed, the electronic device 400 may make a request for payment through an MST signal. Alternatively, when the electronic device 400 first transmits an MST signal and then payment is not completed, the electronic device 400 may make a request for the payment through an NFC signal.

In addition, although the method by which the electronic device 400 recognizes a payment type has been described as an example, the payment type may be determined according to a user's selection.

As described above, the method of temporally separating interference between a signal pertaining to wireless charging and a signal pertaining to payment may include a process of stopping wireless charging that has been performed according to a selection of a payment type and then completing the mobile payment through the selected payment type.

In addition, interference between a signal pertaining to wireless charging and a signal pertaining to a payment may be prevented by a spatial separation method, which is described below in greater detail with reference to FIGS. 11A to 11C.

Figure 11A:
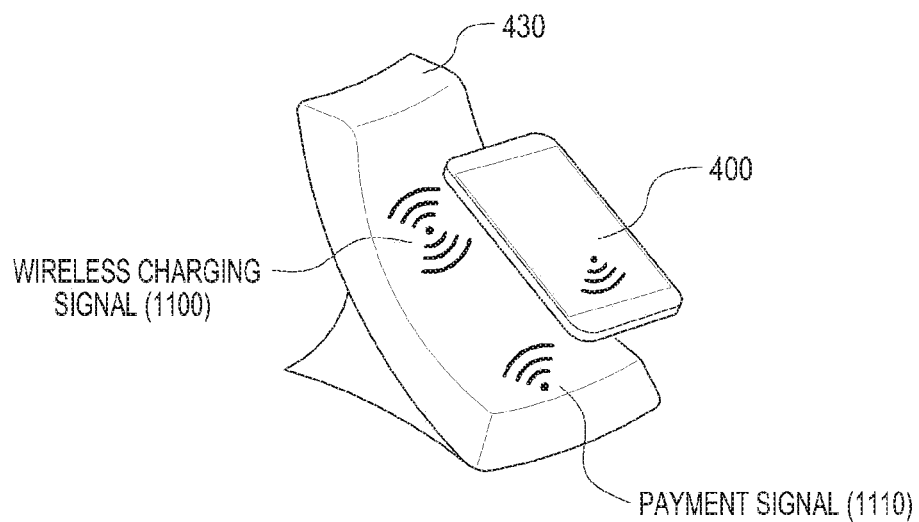
FIG. 11A is an illustration of a payment device that prevents signal interference based on a wireless charging operation and a payment operation according to an embodiment of the present disclosure.

FIG. 11A is an illustration of a structure of a payment device that prevents signal interference based on a wireless charging operation and a payment operation according to an embodiment of the present disclosure.

Referring to FIG. 11A, the payment system 430 in the form combined with the wireless charger may be implemented to have antennas separated from each other such that the location where a wireless charging signal 1100 is generated and the location where a payment signal 1110 is generated are spaced apart from each other by a predetermined interval. Accordingly, when payment is required, an object indicating a spatial location according to the payment type may be displayed on the screen of the electronic device 400. For example, when the user attempts mobile payment through the NFC type of payment device, an NFC tagging location may be displayed on the display of the payment system 430. Further, by displaying an object indicating NFC tagging location and direction on the screen of the electronic device 400, the payment system 430 may induce the user to bring the electronic device 400 to a location facing the NFC tagging location.

Figure 11B:
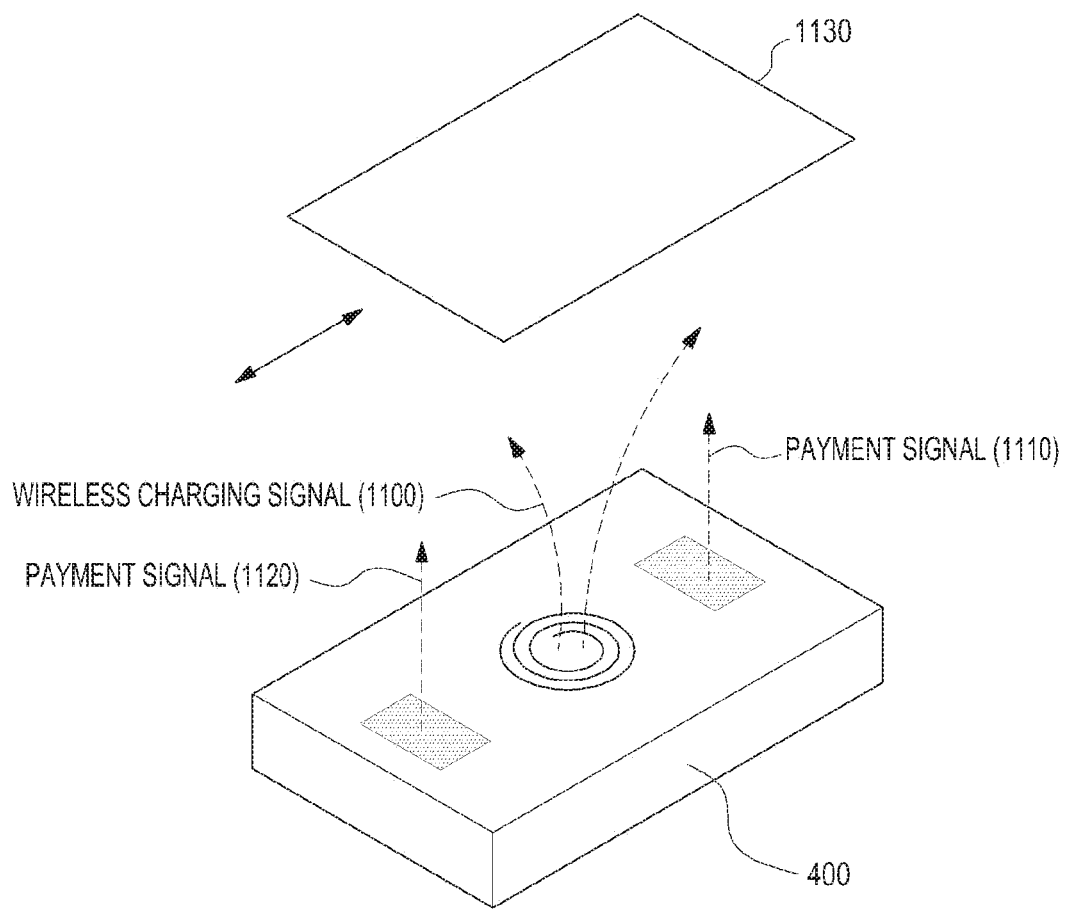
FIGS. 11B and 11C are illustrations of an electronic device that prevents signal interference based on a wireless charging operation and a payment operation according to an embodiment of the present disclosure.

FIG. 11B is an illustration of a structure of an electronic device that prevents signal interference based on a wireless charging operation and a payment operation according to an embodiment of the present disclosure.

Referring to FIG. 11B, inside the electronic device 400, a wireless charging coil for radiating a wireless charging signal 1100, an antenna for outputting or receiving a payment signal 1110 according to an NFC type payment device, or an antenna for outputting or receiving a payment signal 1120 according to an MST type payment device may be spatially separated from each other. In this case, in order to prevent interference between the wireless charging signal 1100 and the payment signal 1110 or 1120, a shield 1300 may be disposed. For example, one or more shields may be disposed to be movable in at least one of a horizontal direction and a vertical direction. FIG. 11B illustrates a case where the shield 1130 which is movable in the horizontal direction is disposed. The shield 1130 may move in a direction for blocking a signal pertaining to power reception from the wireless charger 410 that interferes with a payment signal while the payment signal is transmitted and received for payment. Further, although FIG. 11B illustrates the case where the number of shields 1130 movable in the horizontal direction is one, two or more shields may be implemented to move individually in the horizontal direction.

Figure 11C:
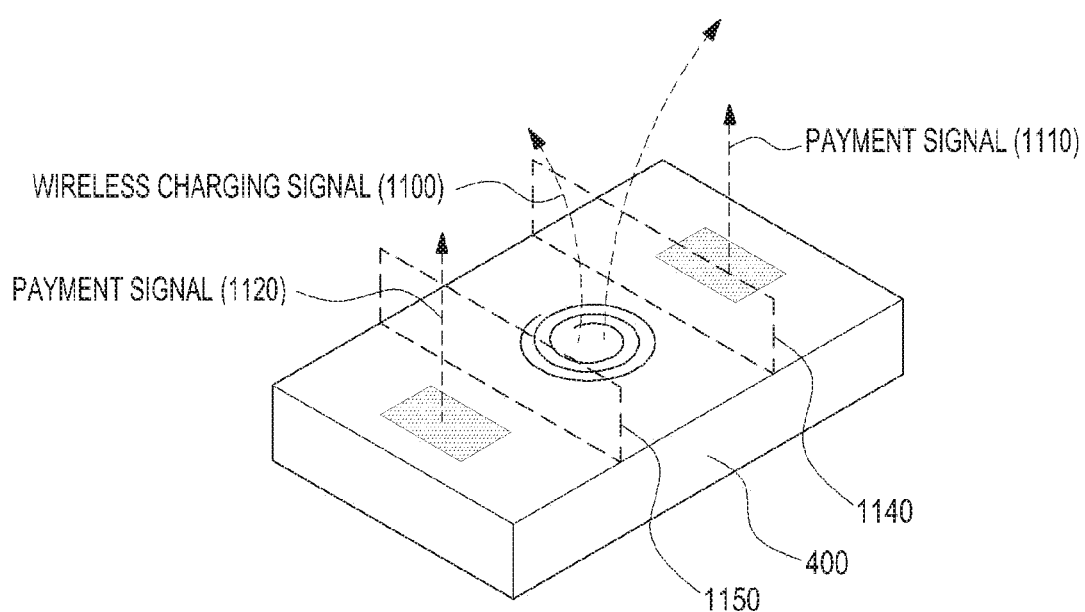

FIG. 11C is an illustration of an electronic device that prevents signal interference based on a wireless charging operation and a payment operation according to an embodiment of the present disclosure.

Referring to FIG. 11C, shields 1140 and 1150 movable in a vertical direction, rather than a horizontal direction, may be disposed. The shield 1140 movable in the vertical direction may be disposed between the payment signal 1110 and the wireless charging signal 1100 and the shield 1150 movable in the vertical direction may be disposed between the payment signal 1120 and the wireless charging signal 1100.

Although FIGS. 11B and 11C illustrate shields, each of which is movable in one direction, the shield movable in the horizontal direction and the shield movable in the vertical direction may be implemented to be disposed together such that all signals are radiated in a spherical pattern.

As described above, through one or more shields movable in at least one direction between the horizontal and vertical directions, when one payment type is selected, it is possible to prevent a signal pertaining to reception of power from the wireless charger 410 from flowing to the antenna radiating the signal according to the selected payment type. Alternatively, the shield may be implemented in the form of a switch for blocking the inflow of the signal.

Figure 12A:
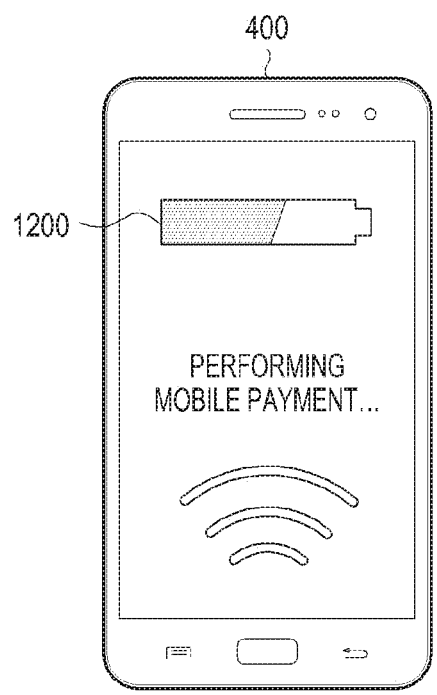
FIGS. 12A, 12B, and 13 illustrate examples of the screen of the electronic device in accordance with wireless charging during the mobile payment according to various embodiments of the present disclosure.
Figure 12B:
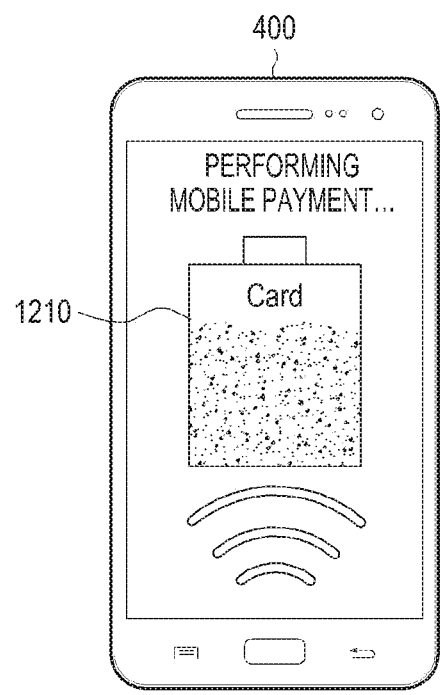
Figure 13:
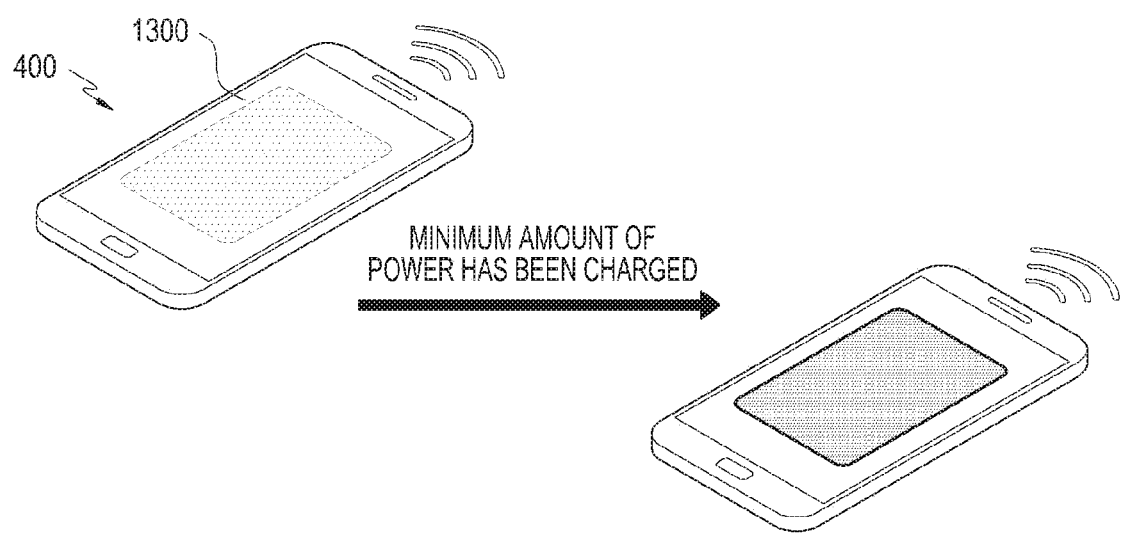

FIGS. 12A, 12B and 13 are illustrations of a screen of an electronic device based on wireless charging during a mobile payment according to an embodiment of the present disclosure.

Referring to FIGS. 12A and 12B, an example of a screen indicating a state where charging for a mobile payment is needed before making the mobile payment is illustrated.

An area of a battery item 1200 may be displayed to indicate that a battery is being charged, or a charging progress state may be displayed through various types of objects 1210 occupying a predetermined area. Further, in the case where charging is needed before mobile payment, notification information as well as various types of objects may also be displayed to allow the user to recognize that the mobile payment will be performed after momentary charging. For example, notification information that indicates progress states of the mobile payment, such as "in preparation", "being charged", and "paying", a minimum target charging amount for the mobile payment, a current battery amount, a minimum target charging time for the mobile payment, and a charging progress process may be displayed.

Referring to FIG. 13, as a battery is charged, a card image 1300 required for a mobile payment may be changed. For example, a blurred image may be displayed, and then when minimum charging is completed, a clear image may be displayed. As described above, various visual effects corresponding to the change in the battery charging state may be output, as well as a color change from black and white to color, and changes in brightness and saturation.

The term "module" as used herein may indicate a unit consisting of hardware, software, or firmware, and may, for example, be used interchangeably with the terms "logic", "logical block", "component", "circuit", and the like. The term "module" may indicate an integrated component, or a minimum unit for performing one or more functions or a part thereof. The term "module" may indicate a device that is mechanically or electronically implemented and may include, for example, an application specific integrated circuit (ASIC), a field programmable gate array (FPGA), or a programmable-logic device, which is known or will be developed in the future, for performing certain operations. At least some of the devices (e.g., modules or functions thereof) or methods (e.g., operations) according to an embodiment of the present disclosure may be implemented by an instruction which is stored in a non-transitory computer-readable storage medium (e.g., the memory 130 in FIG. 1) in the form of a program module. The instruction, when executed by a processor (e.g., the processor 120 in FIG. 1), may cause the one or more processors to execute the function corresponding to the instruction. The non-transitory computer-readable storage medium may include a hard disk, a floppy disk, a magnetic medium (e.g., a magnetic tape), an optical media (e.g., a compact disc ROM (CD-ROM), a DVD), a a magneto-optical media (e.g., a floptical disk), an internal memory, etc. The instruction may include code generated by a complier or code that can be executed by an interpreter. Operations performed by a module, a programming module, or other elements according to an embodiment of the present disclosure may be executed sequentially, in parallel, repeatedly, or in a heuristic manner. At least some operations may be executed according to another sequence, may be omitted, or may further include other operations.

According to an embodiment of the present disclosure, a non-transitory computer-readable storage medium having instructions stored therein is provided. The instructions may be configured to cause at least one processor to perform at least one operation when executed by the at least one processor. The at least one operation may include an operation of identifying a power state of a battery of the electronic device for mobile payment through an external payment device, an operation of, when the power state of the battery is within a first range, receiving power from a wireless charger connected to communicate with the external payment device, and an operation of, when the power state of the battery is within a second range according to the reception of the power from the wireless charger, performing the mobile payment through the external payment device.

Various embodiments disclosed herein are provided merely to easily describe the present disclosure and to facilitate understanding of the present disclosure, but are not intended to limit the scope of the present disclosure. Accordingly, the scope of the present disclosure is intended to be construed as including all modifications or various other embodiments based on the present disclosure, as defined by the appended claims and their equivalents.

What is claimed is:

1. An electronic device, comprising:
   a battery;
   a power management module connected to the battery;
   a power receiver;
   a display receiving power from the battery;
   a memory electrically connected to the display; and
   a processor electrically connected to the memory,
   wherein the memory is configured to store instructions causing the processor to, when executed,
   identify a power state of the battery for a mobile payment using the power management module,
   when the power state is within a first range, control the power receiver to receive power from a wireless charger connected to communicate with an external payment device, and
   when the power state is within a second range due to reception of the power, stop receiving the power and perform the mobile payment through the external payment device connected to communicate with the wireless charger, and
   wherein the first range is a range less than a minimum amount of remaining battery charge required for the mobile payment and the second range is a range greater than or equal to the minimum amount of remaining battery charge required for the mobile payment.

2. The electronic device of claim 1, wherein the processor is further configured to when the power state is within the first range, makes a request for wireless charging to the external payment device to receive power from the wireless charger.

3. The electronic device of claim 1, wherein the processor is configured to acquire information on an amount of power consumed by the mobile payment, update information on an amount of power consumption according to a payment type based on the acquired information on the amount of power consumed by the mobile payment, and store the updated information in the memory.

4. The electronic device of claim 3, wherein the processor is further configured to calculate a number of times the electronic device can perform the mobile payment according to the power state of the battery based on the information on the amount of power consumption according to the payment type stored in the memory and outputs a payment progress state including the calculated number of times the electronic device can perform mobile payment on the display.

5. The electronic device of claim 1, wherein, when the power state is within the first range, the processor records the power state included in the first range in a radio frequency identification (RFID) tag to inform the wireless charger of the power state.

6. The electronic device of claim 1, wherein, when the power state is within the second range due to the reception of the power, the processor is further configured to authenticate a user and then tranbsmit payment information to the external payment device.

7. The electronic device of claim 1, wherein the processor is configured to output at least one of a minimum target charging amount, a current battery amount, a minimum target charging time, and a charging progress process for the mobile payment on the display.

8. The electronic device of claim 1, wherein, when a payment type is selected between a magnetic secure transmission (MST) and a near field communication (NFC) in a state where the power state is within the second range due to the reception of the power, the processor is configured to stop receiving power from the wireless charger, activate the selected payment type, and complete the mobile payment.

9. The electronic device of claim 8, further comprising a movable shield configured to, when the payment type is selected, prevent a signal pertaining to the power reception from the wireless charger from flowing to an antenna radiating a signal according to the selected payment type.

10. A method of performing a mobile payment by an electronic device, the method comprising:
    identifying a power state of a battery of the electronic device for the mobile payment using a power management module connected to the battery;
    when the power state of the battery is within a first range, receiving, via a power receiver of the electronic device, power from a wireless charger connected to communicate with an external payment device; and
    when the power state of the battery is within a second range according to reception of the power from the wireless charger, stopping receiving the power and performing the mobile payment through the external payment device connected to communicate with the wireless charger,
    wherein the first range is a range less than a minimum amount of remaining battery charge required for the mobile payment and the second range is a range greater than or equal to the minimum amount of remaining battery charge required for the mobile payment.

11. The method of claim 10, wherein receiving the power from the wireless charger comprises:
    when the power state of the battery is within the first range, making a request for wireless charging to the external payment device; and
    receiving the power from the wireless charger in response to the request for the wireless charging.

12. The method of claim 10, further comprising, when the power state is within the first range, recording the power state included in the first range in a radio frequency identification (RFID) tag in order to inform the wireless charger of the power state.

13. The method of claim 10, further comprising:
    acquiring information on an amount of power consumed by the mobile payment; and
    updating and storing information on an amount of power consumption according to a payment type based on the acquired information on the amount of power.

14. The method of claim 10, wherein performing the mobile payment comprises, when the power state is within the second range according to the reception of the power, transmitting payment information to the external payment device after a user authentication.

15. The method of claim 10, further comprising:
when a payment type is selected between magnetic secure transmission (MST) and near field communication (NFC) in a state where the power state is within the second range according to the reception of the power, stopping reception of the power from the wireless charger; and
activating the selected payment type and completing the mobile payment.

* * * * *